United States Patent
Pippin et al.

(10) Patent No.: US 11,947,542 B2
(45) Date of Patent: Apr. 2, 2024

(54) CERTIFYING EVENTS IN A STREAMING PIPELINE

(71) Applicant: YAHOO ASSETS LLC, Dulles, VA (US)

(72) Inventors: Michael Pippin, Sunnyvale, CA (US); David Willcox, Urbana, IL (US); Allie K. Watfa, Urbana, IL (US); George Aleksandrovich, Hoffman Estates, IL (US)

(73) Assignee: YAHOO ASSETS LLC, New York, NY (US)

( * ) Notice: Subject to any disclaimer, the term of this patent is extended or adjusted under 35 U.S.C. 154(b) by 237 days.

(21) Appl. No.: 16/881,751

(22) Filed: May 22, 2020

(65) Prior Publication Data
US 2021/0365459 A1    Nov. 25, 2021

(51) Int. Cl.
*G06F 16/24* (2019.01)
*G06F 9/54* (2006.01)
*G06F 16/2455* (2019.01)

(52) U.S. Cl.
CPC ........ *G06F 16/24554* (2019.01); *G06F 9/542* (2013.01)

(58) Field of Classification Search
CPC ............... G06F 16/24568; G06F 9/542; G06F 16/24554
See application file for complete search history.

(56) References Cited

U.S. PATENT DOCUMENTS

| | | | |
|---|---|---|---|
| 2017/0063912 A1* | 3/2017 | Muddu | H04L 63/1416 |
| 2017/0083396 A1* | 3/2017 | Bishop | G06F 11/14 |
| 2020/0034468 A1* | 1/2020 | Lei | G06F 16/27 |
| 2020/0327104 A1* | 10/2020 | Anand | G06Q 20/12 |

* cited by examiner

*Primary Examiner* — Etienne P Leroux
*Assistant Examiner* — Cindy Nguyen
(74) *Attorney, Agent, or Firm* — James J. DeCarlo; Greenberg Traurig, LLP

(57) ABSTRACT

Disclosed are embodiments for providing batch performance using a stream processor. In one embodiment, a method is disclosed comprising detecting a real close of books (COB) of a data transport, the real COB associated with a set of raw events transmitted over the data transport, flushing a stream processor in response to detecting the real COB, and retrieving a set of processed events from a distributed file system after the flushing is complete. A fact COB computation is then performed on the set of processed events and the set of raw events, the fact COB computation outputting a number of missing events, each missing event representing a raw event that is not present in the set of processed events. The processed events are then certified upon determining that the number of missing events is below a threshold.

17 Claims, 11 Drawing Sheets

CERTIFYING EVENTS IN A STREAMING PIPELINE

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

In the era of big data processing, data pipelines have become vital to ingesting, processing, and outputting large quantities of data at high velocity and having high variability. In general, a data pipeline comprises a series of automated processing stages that take raw input data and convert the raw input data into a more suitable format for consumption by downstream computer processing systems.

Various architectures of data pipelines exist, including batch, Lambda, and Kappa architectures. Batch data pipelines process data in "batches" at regular intervals and are suitable for non-critical functionality while providing high reliability of data processing. Batch data pipelines, however, suffer from not being able to process data in real-time. Thus, a lag behind the ingestion of data and output of useful information or knowledge always exists in a batch data pipeline.

Lambda pipelines utilize a batch processor concurrently with a stream processor. In these pipelines, the batch processor processes all data within a historical batch while the stream processor "augments" the processed batch data with the results of stream processing. Eventually, the batch processor will "re-process" the data processed by the stream processor and overwrite the information generated by the stream processor. Lambda pipelines are fast, due to the use of stream processors; however, they require duplication of processing logic in both the stream processors and the batch processors. Further, Lambda pipelines use twice the processing hardware due to the use of two separate processing paradigms (i.e., stream and batch, which process the data in the same manner).

Like Lambda pipelines, Kappa pipelines utilize a stream processor. However, Kappa pipelines eschew a batch processor. Kappa pipelines require frequent "re-running" of event streams through the stream processor to provide simulated batch performance. Kappa pipelines ensure that streaming data is processed correctly (e.g., the pipeline does not drop or duplicate data); however, these pipelines ensure this by re-executing processing and are thus slower than pure streaming pipelines. Further, since Kappa pipelines use stream processing techniques, there is no method for performing more complex operations such as joins or aggregations, since these operations inherently require access to a full (e.g., batch) dataset. That is, stream processors inherently cannot perform these operations, thus replaying streams does not remedy this problem.

BRIEF SUMMARY

This disclosure recognizes a need in the art for a new pipeline architecture that provides the advantages of stream processors (e.g., speed) with the advantages of batch processors (e.g., integrity and complex operations). The disclosed embodiments provide these advantages and solve other problems in existing pipelines.

The disclosed embodiments describe an improved big data processing system that uses a stream processing engine with additional hardware and software to harden inaccuracies detected during stream processing.

In one embodiment, a method is disclosed comprising detecting a real close of books (COB) of a data transport, the real COB associated with a set of raw events transmitted over the data transport; flushing a stream processor in response to detecting the real COB; retrieving a set of processed events from a distributed file system after the flushing is complete; performing a fact COB computation on the set of processed events and the set of raw events, the fact COB computation outputting a number of missing events, each missing event representing a raw event that is not present in the set of processed events; certifying the processed events upon determining that the number of missing events is below a threshold.

In another embodiment, a non-transitory computer-readable storage medium for tangibly storing computer program instructions capable of being executed by a computer processor is disclosed, the computer program instructions defining the steps of detecting a real close of books (COB) of a data transport, the real COB associated with a set of raw events transmitted over the data transport; flushing a stream processor in response to detecting the real COB; retrieving a set of processed events from a distributed file system after the flushing is complete; performing a fact COB computation on the set of processed events and the set of raw events, the fact COB computation outputting a number of missing events, each missing event representing a raw event that is not present in the set of processed events; certifying the processed events upon determining that the number of missing events is below a threshold.

In another embodiment, a device is disclosed comprising a processor and a storage medium for tangibly storing thereon program logic for execution by the processor, the stored program logic causing the processor to perform the operations of detecting a real close of books (COB) of a data transport, the real COB associated with a set of raw events transmitted over the data transport; flushing a stream processor in response to detecting the real COB; retrieving a set of processed events from a distributed file system after the flushing is complete; performing a fact COB computation on the set of processed events and the set of raw events, the fact COB computation outputting a number of missing events, each missing event representing a raw event that is not present in the set of processed events; certifying the processed events upon determining that the number of missing events is below a threshold.

The illustrated embodiments provide numerous benefits over existing pipelines. The disclosed embodiments reduce data processing and certification times by certifying events using a stream processor versus a batch processor. Thus, the illustrated embodiments do not require a "waiting" period prior to certifying results and can certify results in real-time or near real-time. The disclosed embodiments additionally utilize a single pipeline and thus do not require the hardware duplication, software complexity, and human resources required by Lambda pipelines. Relatedly, since application-level code must only be deployed once, rapid changes in data processing can be implemented without requiring separate development workflows. Additionally, since only one codebase is used, there is no risk of variations in processing between pipelines. Finally, in existing pipelines, sacrifices for speed can lead to a more significant variation between the initially posted results from the streaming pipeline and the final results from batch processing. As the latency of batch increases relative to streaming, this can lead to a lack of confidence in reporting as the variation becomes more pronounced. The disclosed embodiments alleviate this deficiency.

DETAILED DESCRIPTION

Figure 1A:
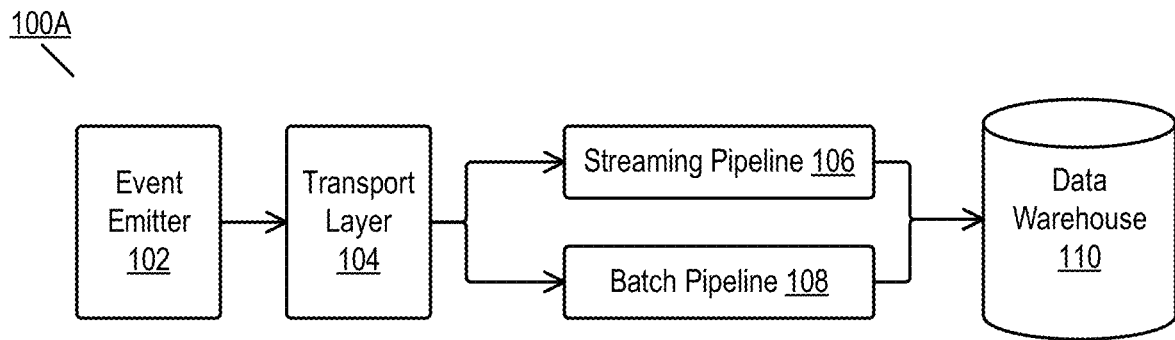
FIG. 1A is a block diagram illustrating a processing system employing a Lambda architecture.

FIG. 1A is a block diagram illustrating a processing system employing a Lambda architecture.

In the illustrated embodiment, events in the system (100a) originate from one or more event emitters (102). As used herein, an event refers to any type of data generated by a computing system. Generally, most events include arbitrary data as well as a timestamp indicating when the event emitter (102) generated the data. Alternatively, or in conjunction with the preceding, the system (100a) adds a timestamp representing the time the pipelines (106, 108) receive the event. In some embodiments, the timestamp comprises a standard time (e.g., based on a 24-hour clock). In some embodiments, the timestamp comprises a numerical value (e.g., time since UNIX epoch). In other embodiments, the timestamp may comprise a sequence number or other incrementing (or otherwise changing) value. In some embodiments, events further include nonce values to ensure uniqueness.

The event emitters (102) can comprise any computing system capable of generating data. The disclosure places no limitations on the type of data or type of systems capable of generating such data. As one example, an event emitter may include a digital analytics system configured to track and monitor user events on webpages or in mobile apps. A digital analytics platform generates many events as users access products. One example is the delivery of advertising creatives. In these scenarios, the analytics platform generates an event indicating that a server transmitted the creative to the end-user. The analytics platform also generates an event indicating that the end-user device displayed the creative (i.e., an impression). If the end-user interacts with the creative, the analytics platform generates a "click" event (which may be any type of interaction including touch events and thus is not limited to physical mouse clicks). In certain embodiments, the analytics platform also generates conversion events that indicate that after an impression, and after a click, the end-user has completed another action (e.g., completes a digital purchase) that is related to the previous events. In some embodiments, the analytics platform tracks all of these events via a client-side identifier stored in, for example, a cookie or other end-user storage mechanism.

In some embodiments, event emitters (102) are part of the system (100a). That is, in some embodiments, the system (100a) includes and has some level of control over the event emitters (102). Examples of this type of arrangement include internal data sources for an organization (e.g., internal analytics tracking). In other embodiments, the event emitters (102) comprise third-party systems. In some embodiments, the system (100a) receives events from both internal and external event emitters (102).

In either scenario, event emitters (102) transmit events over a transport layer (104). The transport layer (104) comprises one or more network protocols and one or more physical media used for transporting data. The disclosure does not unduly limit the structure of the transport layer. In some embodiments, the system (100a) uses an Internet protocol suite (e.g., transmission control protocol (TCP) and Internet protocol (IP)) as the transport layer (104). The system (100a) may use other models such as those adhering to the Open Systems Interconnection (OSI) model or other types of protocol models. In some embodiments, the transport layer (104) performs other operations on the events beyond network routing (e.g., TCP/IP). For example, the transport layer (104) may compress events using, as an example, gzip or other compression algorithms.

The specific internal workings of the transport layer (104) are not limiting, and the system (100a) may ignore various features of the transport layer (104) that are handled entirely in the transport layer (e.g., congestion control in a TCP layer). However, as discussed in more detail herein, the transport layer (104) may include inherent data transfer characteristics that impact the processing of the data by systems. One example, discussed in more detail in FIG. 2 et seq, is that some transport layer (104) designs may unintentionally (or, in some cases, intentionally) duplicate events transmitted over a network. In such networks, the event emitters (102) transmit one event, but the pipelines (106, 108) receive two or more events. A more concrete example of such a transport layer is a publish-subscribe system such as Apache® Kafka, which can provide "at least once" delivery of events.

As illustrated, the system (100a) routes events from the transport layer (104) to both a streaming pipeline (106) and a batch pipeline (108). In the illustrated embodiment, the batch pipeline (108) processes data in batches. As used herein, a batch refers to a period in which the batch pipeline (108) analyzes data (e.g., every hour). The disclosure does not describe the specific inner workings of the batch pipeline (108) in detail; however, the batch pipeline (108) comprises any processing system that provides accurate processing of data. Examples of batch pipelines include Hadoop clusters. The batch pipeline (108) ensures this accuracy by running slowly and at fixed intervals upon receiving all needed data. Since the batch pipeline (108) requires a fixed period of data (e.g., one hour) and a second fixed period to process the data (e.g., three hours), the batch pipelines (108) are consistently "behind" the current time. That is, when the batch pipeline (108) writes data to the data warehouse (110), the data written is "stale" by a fixed amount of time (e.g., four hours in the previous examples). However, as stated above, consumers of the batch-processed data can be confident that the data is accurate.

As a brief aside, before Lambda systems, big data systems often only included a batch pipeline (108) and did not include a streaming pipeline (106). As a result, such systems produced consistently delayed results. To remedy this delay, the system (100a) includes a streaming pipeline (106). Such a pipeline may comprise one or more stream processors such as Apache® Storm processors or similar stream processors. In contrast to the batch pipeline, the streaming pipeline (106) processes data in real-time or near real-time. Thus, when the streaming pipeline (106) receives an event over the transport layer (104), it immediately processes or transforms the event and writes the processed event to the data warehouse (110).

Since the streaming pipeline (106) processes events quickly and in isolation, the streaming pipeline (106) may introduce errors in the processed data. For example, the streaming pipeline (106) generally does not guard against writing duplicate data if the pipeline (106) receives duplicate events. Similarly, the streaming pipeline (106) may inadvertently drop some events. Thus, the streaming pipeline (106) is fast but inaccurate.

In the illustrated embodiment, the data warehouse (110) segments data received from the streaming pipeline (106) and the batch pipeline (108) into two separate storage areas. Additionally, as the batch pipeline (108) "catches up" to the data processed by the streaming pipeline (106), the data warehouse (110) overwrites the results of the streaming pipeline (108). Thus, at any given moment, the data warehouse (110) stores accurate, batch-processed data and a smaller, more recent subset of inaccurate stream-processed data. Absent system failures, the size subset of the inaccurate data remains constant while the size of the accurate data increases over time.

To support the above format of the data warehouse, the system (100a) must duplicate logic between the streaming pipeline (106) and the batch pipeline (108). Since the streaming results must be "reconciled" with the results of the batch processing, the streaming pipeline (106) and batch pipeline (108) must process the events in the same manner. This requirement doubles both the development time and the computing resources needed to support both pipelines (106, 108). Additionally, the system (100a) requires additional software and hardware to enable the data warehouse (110) to perform the reconciliation process after the completion of each batch processing job.

Figure 1B:
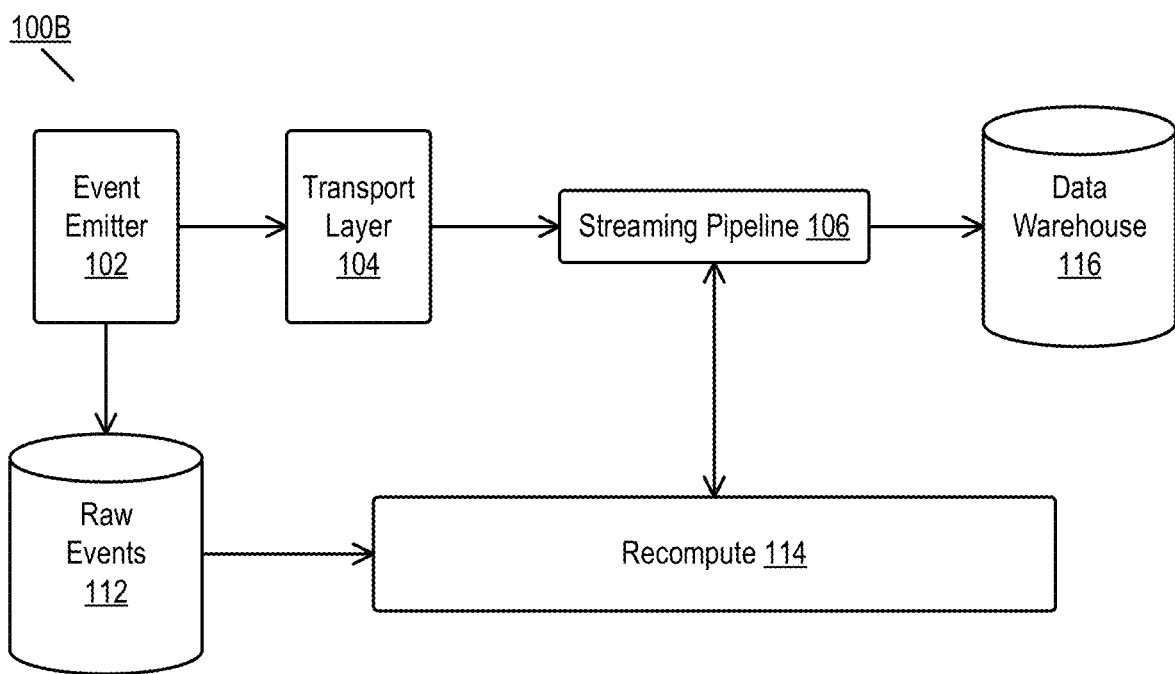
FIG. 1B is a block diagram illustrating a processing system employing a Kappa architecture.

FIG. 1B is a block diagram illustrating a processing system employing a Kappa architecture. The illustrated system (100b) solves some of the problems of Lambda architectures, as discussed in the preceding figure. However, the system (100b) introduces additional problems and fails to provide full batch support.

Various elements of the system (100b) are identical, or nearly identical, to those similarly numbered elements of FIG. 1A. The event emitters (102) and the data transport layer (104) perform the same functions as previously described. Also, the streaming pipeline (106) may perform many, if not all, of the same operations of the streaming pipeline (106) discussed in FIG. 1A.

As illustrated, the streaming pipeline (106) receives events generated by the event emitters (102) over the data transport layer (104). The streaming pipeline (106) processes this data and writes the processed data to the data warehouse (116). In contrast to the data warehouse (110) in FIG. 1A, the data warehouse (116) may only include a single storage area for data given the absence of a batch processing layer.

As described in the description of the previous system (100a), streaming pipelines (106) generally cannot guarantee the accuracy of data processing. Some systems (e.g., 100b) remedy this problem by employing "micro batching" whereby small batches of stream events are processed simultaneously. In general, these batches represent milliseconds of events, thus providing reasonable speed while simulating small batches. Micro-batching, however, fails to provide the level of accuracy provided by larger (e.g., one hour) batches. Another technique uses recompute logic (114) to re-process streaming events when the logic of the streaming pipeline (106) changes or based on other requirements. In this scenario, the system (100b) can store raw events in the raw events storage module (112), the recompute logic (114) retrieves these events. The recompute logic (114) then streams the events into the stream pipeline (106) for re-processing. In one scenario, the recompute logic (114) executes when the system (100b) changes the processing logic of the streaming pipeline. Thus, if the system (100b) modifies how the streaming pipeline (106) processes events, the recompute logic (114) simulates a historical event stream. In another embodiment, the recompute logic (114) can stream data from the raw events storage module (112) to the streaming pipeline (106) at fixed intervals, thus simulating a batch processing mode. However, there are numerous challenges to this approach that limit its effectiveness. First, data from the raw events storage module (112) must be re-streamed in the same order as streamed initially, to ensure the integrity of the re-processing. Thus, the recompute logic (114) reproduces inaccuracies relating to out-of-order events during the re-streaming. Second, the infrastructure that supports the streaming pipeline (106) generally cannot handle significant increases in streaming data, thus limiting the total amount of re-streamed data the streaming pipeline (106) can handle at any given time. Third, and most importantly, the streaming pipeline (106) cannot inherently perform various operations that a batch pipeline (108) can perform, such as joins or aggregations. Thus, even if re-streamed, the output of the streaming pipeline (106) always lacks these advanced operations.

Figure 2:
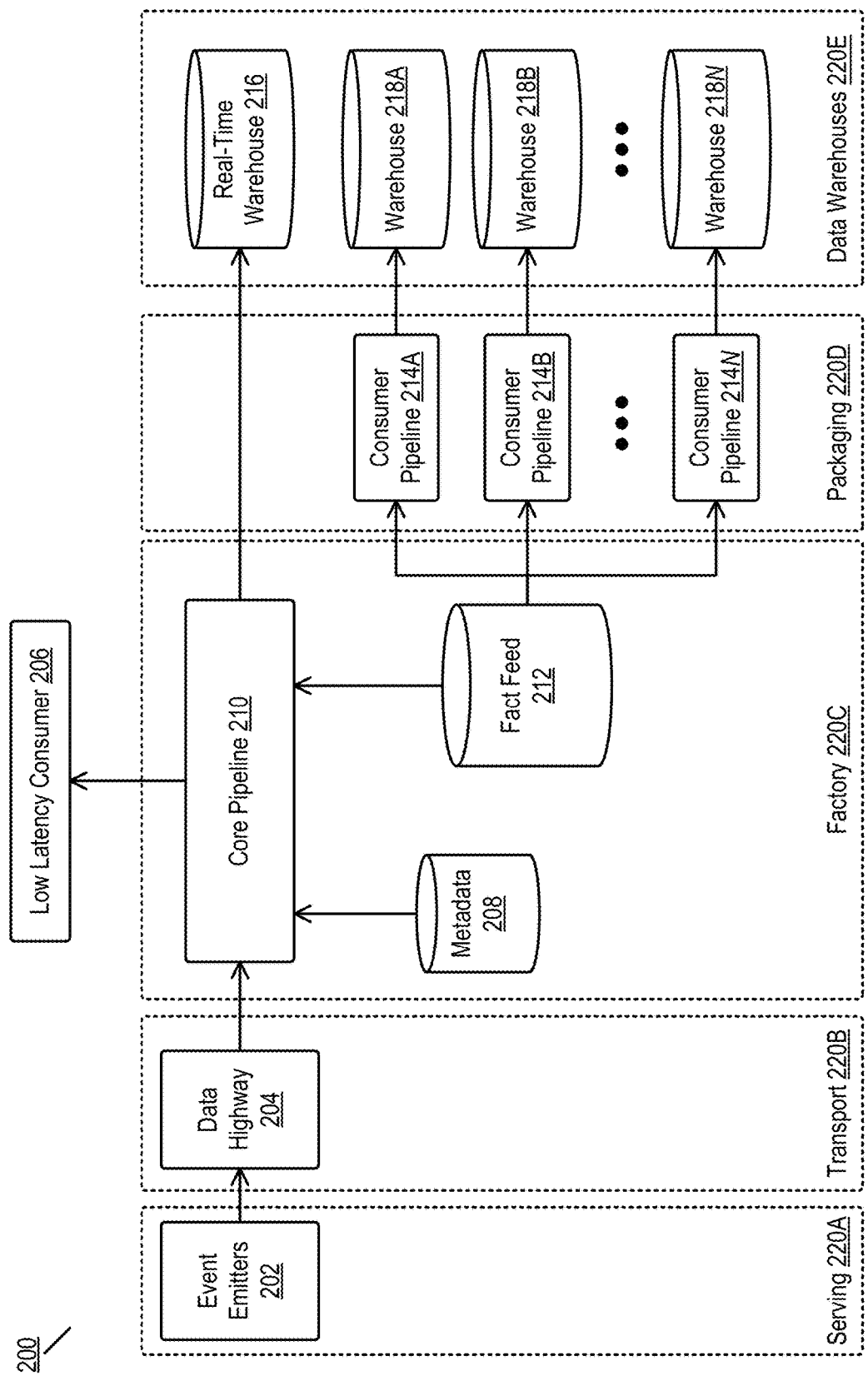
FIG. 2 is a block diagram illustrating a data processing system according to some embodiments of the disclosure.

FIG. 2 is a block diagram illustrating a data processing system according to some embodiments of the disclosure.

The illustrated system (200) segments the data processing into multiple logical layers. In some embodiments, these layers may also comprise physical layers, with each layer physically connected via a network interconnect. The illustrated layers comprise serving (220a), data transport (220b), pipeline factory (220c), packaging (220d), and warehousing (220e) layers.

The serving layer (220a) includes one or more event emitters (202). In the illustrated embodiment, these event emitters (202) can be similar or identical to the event emitters (102) discussed previously. As a few examples, the event emitters (202) can comprise systems including, but not limited to, ad servers, web servers, and beacon servers, that produce raw traffic events and send the events factory layer (220c) via the data transport layer (220b). In the illustrated embodiment, the data transport layer (220b) represents the previously described data transport (204). In the illustrated embodiment, the data transport layer (220b) comprises multiple network topologies and protocols that, when combined, deliver events to the factory layer (220c).

Figure 3:
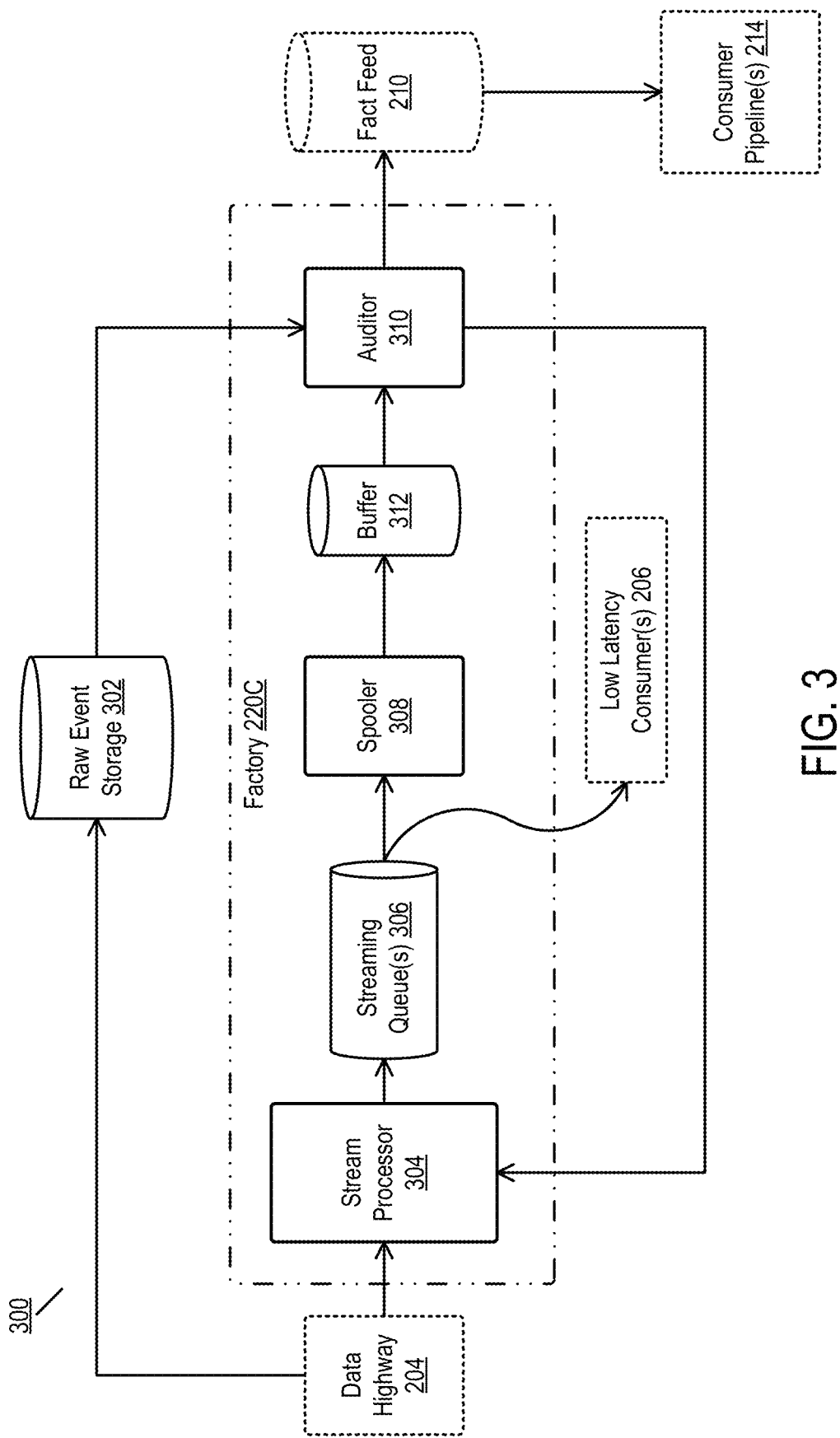
FIG. 3 is a block diagram illustrating a pipeline factory according to some embodiments of the disclosure.
Figure 4:
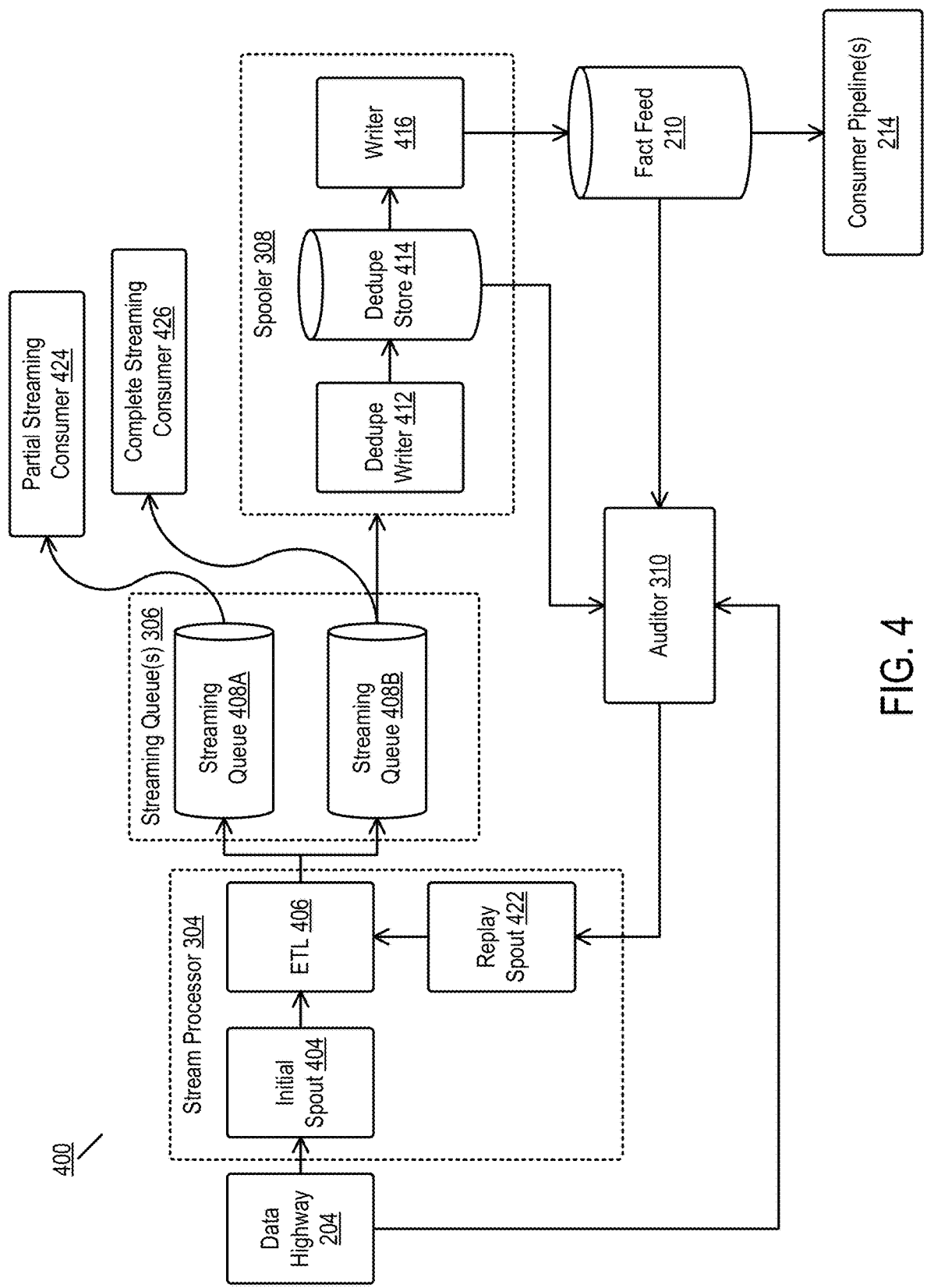
FIG. 4 is a block diagram illustrating a core pipeline according to some embodiments of the disclosure.

In the illustrated embodiment, the factory layer (220c) receives raw events from the data transport layer (220b) and processes the events via a core pipeline (210). The description of FIG. 3 provides further detail regarding the factory layer (220c), and the description of FIG. 4 provides further detail regarding the core pipeline (210). Thus, the following description of the factory layer (220c) only briefly describes the layer (220c) and the core pipeline (210), and FIGS. 3 and 4 present further detail.

The factory layer (220c) is responsible for doing the bulk of the processing of event traffic via the core pipeline (210). The following description describes exemplary processing operations performed by the core pipeline (210). The core pipeline (210) may perform some or all of the following operations as well as additional operations.

In one embodiment, in the serving (220a) and data transport (220b) layers, devices often compress and bundle data to conserve bandwidth. As a result, the core pipeline (210) may perform a parsing operation that unpacks or processes complex data structures (e.g., blobs) so that downstream consumer systems can access the data. Thus, as one example, the core pipeline (210) can detect that an incoming event was compressed using a gzip algorithm and may first unzip the event.

In another embodiment, the core pipeline (210) performs explosion operations. An explosion operation comprises unpacking composite events. For example, a multi-serve event comprises an event indicating that an end-user device received a set of content to be displayed. Thus, the multi-serve event comprises a data structure describing multiple items of content (e.g., advertisements). The core pipeline (210) may transform a single multi-serve event into multiple single-serve events such that each item of content in the event is associated with an independent event for later processing.

In another embodiment, the core pipeline (210) performs metadata annotation operations. As illustrated, the core pipeline (210) communicates with a metadata store (208). In one embodiment, the metadata store (208) comprises a data storage device such as a MySQL database or other type of relational database. In other embodiments, the metadata store (208) may comprise other types of data storage devices (e.g., a key-value data store). The core pipeline (210) accesses the metadata store (208) to perform dimensional annotation on incoming event data. As used herein, dimensional annotation refers to the augmenting of data with additional other data. For example, a content serving event may only a line item identifier identifying the served content. The core pipeline (210) may access the metadata store (208) and look up a parent insertion order, an advertiser identifier, and an organization for that line item identifier. The core pipeline (210) may then augment the line item identifier with this metadata to generate an annotated event. In this way, downstream consumer systems can group and aggregate based on the line item identifier.

In another embodiment, the core pipeline (210) performs traffic annotations. A traffic annotation comprises a complex join of an event with a prior event. For example, a click event may need to be joined with a first impression event to annotate the click with auction information or targeting information that is only available in the first impression.

In another embodiment, the core pipeline (210) performs arbitrary computations dictated by business logic. An example of this type of computation is a currency conversion. By doing the operation only once in the core pipeline (210), the system (200) can ensure consistency across all subsequent consumer systems, rather than requiring downstream consumer systems to implement the same rules and possibly arrive at different results.

In another embodiment, the core pipeline (210) validates incoming events. In this embodiment, the core pipeline (210) can filter events based on traffic conditions.

In another embodiment, the core pipeline (210) performs deduplication on incoming events. As discussed previously, the data transport layer (220b) may support "at least once" semantics. Alternatively, or in conjunction with the preceding, event emitters may allow duplicate events. Regardless of the source of duplication, the core pipeline (210) ensures that all events are processed and stored once and not duplicated. For example, the core pipeline (210) may allow more than one click event per impression event during a given period.

In another embodiment, the core pipeline (210) performs normalization on the received events. During a normalization operation, the core pipeline (210) "fits" an event to a particular schema or layout to facilitate reporting. This schema or layout is typically a standard field alignment and transformation.

Finally, in some embodiments, the core pipeline (210) performs a fast feedback operation. In this operation, the core pipeline (210) provides feeds or streams of data at very low latency to low-latency consumers (206) such as an ad serving budget control system. Typically, most consumer systems wait until the core pipeline (210) has completed all processing steps; however, some consumer systems are willing to sacrifice quality for timing. These specialty stages can be critical to some consumer systems.

In general, the core pipeline (210) processes events linearly: the quality of the event data increases as data passes from one processing operation to the next. Ultimately, after the core pipeline (210) applies all operations to the event data, the core pipeline (210) writes the processed event to one or more fact feeds (212). In the illustrated embodiment, a fact feed (212) comprises a log of every event that was received by the core pipeline (210) and any additional information that the core pipeline (210) annotates or computes. The fact feeds (210) become the source of truth for the entire system (200). By having the core pipeline (210) compute the fact feed (212) used by subsequent consumers pipelines (214a, 214b, 214n), the overall quality of the system (200) is improved.

Since the system uses a centralized fact feed (212), the core pipeline (210) never removes any field from an event. Additionally, the core pipeline (210) does not modify any raw field that it receives from the core pipeline (210) from the data highway (204). However, as one exception, the core pipeline (210) may replace null or empty fields with a static or default value, as this may assist downstream consumer systems (214a, 214b, 214n). In most embodiments, the core pipeline (210) does not attempt to "correct" or "fix" invalid values in an event. However, the core pipeline (210) may deviate from this requirement to recover from failed launches or bugs. In some embodiments, if the core pipeline (210) violates this requirement and fixes an invalid value in an event, the core pipeline (210) annotates the record with a flag so that a downstream consumer system can monitor the rule.

Importantly, the core pipeline (210) also ensures that no event is duplicated in the final fact feed (212). Thus, the core pipeline (210) never intentionally duplicates or allows duplicate events to result from the operations.

In the illustrated embodiment, the packaging layer (220d) comprises various consumer pipelines (214a, 214b, . . . 214n) retrieve or receive data from the fact feed (212). The packaging layer (220d) accesses the fact feed (212) and provides the processed events therein to downstream consumer pipelines (214a, 214b, . . . 214n). Whereas the factory layer (220c) is typically a complex, but linear processing stage, the packaging layer (220d) is typically composed of multiple parallel consumer pipelines (214a, 214b, . . . 214n). Consumer pipelines (214a, 214b, . . . 214n) are typically minimal, possibly single-stage pipelines that project and aggregate the events in the fact feed (212) for loading into a warehouse (e.g., 218a, 218b, . . . 218n) or similar system. The availability of the fact feed (212) triggers consumer pipelines (214a, 214b, . . . 214n), and thus the consumer pipelines (214a, 214b, . . . 214n) may run in parallel with one another.

In some instances, the consumer pipelines (214a, 214b, . . . 214n) are external to the factory layer (220c) and warehouse layer (220e). In other instances, the system (200) includes and controls the consumer pipelines (214a, 214b, . . . 214n). Alternatively, or in conjunction with the preceding, the warehousing layer (220e) may be external to the system (200). In various embodiments, the consumer pipelines (214a, 214b, . . . 214n) generally perform some or all of the following operations (or combinations thereof).

In one embodiment, the consumer pipelines (214a, 214b, . . . 214n) perform mapping and transformation operations. In these operations, the consumer pipelines (214a, 214b, . . . 214n) may require the data in a format different than the format of the fact feed (212). For example, the consumer pipelines (214a, 214b, . . . 214n) may map enumerated values (possibly in a lossy fashion) to fit a further downstream consumer data model.

In another embodiment, the consumer pipelines (214a, 214b, . . . 214n) perform projection operations. In some embodiments, consumer pipelines (214a, 214b, . . . 214n) will typically not require every field of the fact feed (212). Thus, the consumer pipelines (214a, 214b, . . . 214n) only ingest a small fraction of the available columns.

In another embodiment, the consumer pipelines (214a, 214b, . . . 214n) perform aggregation operations. In some embodiments, the consumer pipelines (214a, 214b, . . . 214n) aggregate facts and produce metric fields for efficient loading into a database or similar data store.

In another embodiment, the consumer pipelines (214a, 214b, . . . 214n) perform reverse annotation joins (e.g., right outer joins). In some embodiments, the consumer pipelines (214a, 214b, . . . 214n) perform join operations that cannot be implemented efficiently within the core pipeline (210). For example, a data science consumer pipeline may require a feed containing every impression event joined to any future click events recorded in the fact feed (212). Because this type of pipeline requires data collected over a long period before processing can begin, it would negatively impact all consumer pipelines (214a, 214b, . . . 214n) to wait. Therefore, the pipeline performs these joins in batch outside of the core pipeline (210).

In another embodiment, the consumer pipelines (214a, 214b, . . . 214n) perform rollup operations. In some embodiments, the consumer pipelines (214a, 214b, . . . 214n) may choose to create rollup feeds of the raw facts stored in fact feed (212). For example, the consumer pipelines (214a, 214b, . . . 214n) may create an hourly feed from a five-minute fact feed. The consumer pipelines (214a, 214b, . . . 214n) may perform this operation to use fewer filenames in a distribute filed system (e.g., the Hadoop Filesystem, HDFS) since such a file system collapses multiple files into larger single files. Further, the rollup may typically transform the data into a columnar format like Optimized Row Columnar (ORC) to promote faster ad hoc projection.

In another embodiment, the consumer pipelines (214a, 214b, . . . 214n) perform sketch operations. In some embodiments, as the consumer pipelines (214a, 214b, . . . 214n) generate aggregates, the consumer pipelines (214a, 214b, . . . 214n) may produce aggregate sketch columns to capture unique users or similar complex computations. The consumer pipelines (214a, 214b, 214n) can perform this expensive operation once on behalf of multiple end-users or downstream systems.

In another embodiment, the consumer pipelines (214a, 214b, . . . 214n) perform cleansing operations. In some embodiments, the consumer pipelines (214a, 214b, . . . 214n) may cleanse data in the fact feed (212) for a specific purpose. For example, cookies or personally identifiable information (PII) might need to be anonymized, or the consumer pipelines (214a, 214b, . . . 214n) may need to obscure data to enforce data visibility controls.

In some embodiments, the consumer pipelines (214a, 214b, . . . 214n) can be hierarchal. That is, a first consumer pipeline may perform one or more shared steps, and downstream consumer pipelines use the output of the first consumer pipeline as input.

After processing by consumer pipelines (214a, 214b, . . . 214n), each of the consumer pipelines (214a, 214b, . . . 214n) output further processed event data to respective data warehouses (218a, 218b, . . . 218n) in the warehousing layer (220e). The warehousing layer (220e) is generally the final stage of the system (200), where data is loaded into various systems to facilitate reporting, billing, or analysis. A data team may be responsible for various aspects of the warehousing, or it may be delegated to a data customer instead. Operations for a data team include loading, replication, and verification. In loading operations, the system (200) may need to load the data into a data warehouse (e.g., an Oracle or Druid data warehouse) or place the data onto a shared drop box or similar system. In replication operations, the system (200) may need to replicate a data feed to another data processing (e.g., Hadoop) cluster in a different co-location. In a verification operation, the system (200) may need to verify that the data loaded into a warehouse (218a, 218b, . . . 218n) accurately matches the original fact feed (210) (i.e. certify there was no data loss).

As illustrated, in some embodiments, data bypasses the packaging layer (220d). In these embodiments, the core pipeline (210) streams output directly to a real-time data warehouse (216). In the illustrated embodiment, the real-time data warehouse (216). In the illustrated embodiment, the system (200) may use a real-time data warehouse (216) for reporting or similar functions that do not require high data accuracy.

FIG. 3 is a block diagram illustrating a pipeline factory according to some embodiments of the disclosure.

In the illustrated embodiment, a data highway (204) delivers events from one or more event emitters (not illustrated) to a factory layer (220c) and raw event storage (302). The description of FIG. 2 provides further detail regarding the data highway (204) which is not repeated herein.

In the illustrated embodiment, the raw event storage (302) may comprise a distributed file system (e.g., HDFS). In one embodiment, the system (300) writes raw events to the raw event storage (302) as they are received. In some embodiments, the system (300) writes the raw events to raw event storage (302) in a batch mode. That is, the system (300)

writes a separate file for each batch period (e.g., one hour), the file including all events received during that period. In some embodiments, not illustrated, external consumer systems can access the raw event storage (302) to perform batch processing. Thus, in some embodiments, the raw event storage (302) can be used to provide backwards compatibility with existing batch pipelines.

As illustrated, a stream processor (304) receives events from the data highway (204). In one embodiment, the stream processor (304) comprises a distributed stream processor. In one embodiment, the stream processor (304) comprises a streaming topology that defines data processing stages to perform on events.

One example of a stream processor (304) is an Apache® Storm topology. Briefly, a Storm topology is a graph of inputs and processing nodes. The topology receives events as input streams. Each event in the input stream comprises a tuple and the input stream itself is an unbounded series of such tuples. The topology receives streams from input sources, referred to as "spouts." The topology performs all processing in individual processing nodes, referred to as "bolts." The topology defines the input to a bolt as either a spout or another bolt. Thus, the topology defines connects between spouts and bolts. The output of one or more bolts forms the output of the topology.

In the illustrated embodiment, the stream processor (304) performs any or all of the processing operations described in the description of core pipeline (210) in FIG. 2. Details of these operations are not repeated herein. Importantly, the stream processor (304) ensures that a given event received over the data highway (204) is output at most once to the streaming queue(s) (306). Thus, during processing, the stream processor (304) detects and drops any duplicated events. FIG. 4 provides further detail regarding specific techniques for performing this detection and dropping.

As illustrated, the stream processor (304) outputs the processed and de-duplicated event stream to one or more streaming queues (306). In one embodiment, the streaming queues (306) comprise one or more Apache® Kafka queues. Since the event stream is processed by the stream processor (304), the data stored in the streaming queues (306) can be considered as source of truth for downstream consumers. Thus, a low-latency consumer system (206) can directly access the streaming queues (306). In this manner, the system (300) can simulate a fully streaming pipeline. As will be discussed, since the stream processor (304) processes the event stream and ensures that no records are dropped or duplicated, the simulated stream in the streaming queues (306) is more accurate than a raw event stream. Furthermore, as will be discussed, the output of the stream processor (304) includes the results of more complicated or advance operations (e.g., joins or dimensional annotation) which are not possible using traditional stream processing techniques.

A spooler (308) and auditor (310) use the output of the stream processor (304) to support advanced operations by the stream processor (304). FIG. 4 provides more detail regarding the spooler (308) and reference is made to that description.

In one embodiment, the spooler (308) comprises a second stream processor. The spooler (308) ensures that a one-to-one mapping between streamed data and data written to the fact feed (210) exists. The spooler (308) also ensures that streaming events retrieved from the queues (306) appears exactly once in the fact feed (210) (i.e., no events in the queues, 306, are duplicated). As such, the spooler (308) may comprise a separate stream topology similar to the stream processor (304). In contrast to the stream processor (304), the spooler (308) reads events from the streaming queues (306). Thus, the event stream to the spooler (308) comprises the processed events. As illustrated, prior to writing to the fact feed (210), the spooler (308) outputs to the auditor (310) via a buffer (312). In one embodiment, the output of the spooler (308) comprises a flat file (e.g., an HDFS file) and the buffer (312) comprises a distributed file system such as HDFS. In one embodiment, this flat file comprises a set of events occurring in a given batch period. Thus, the flat file simulates batch processing, but using the streaming events.

In the illustrated embodiment, an auditor (310) receives the output of the spooler (308). As described above, in some embodiments, the output of the spooler (308) comprises a batch file of events. In the illustrated embodiment, the auditor (310) also accesses raw event storage (302). In one embodiment, the format of the raw event storage (302) and the output of the spooler (308) are the same. For example, spooler (308) may write flat files to HDFS buffer (312) and raw event storage (302) may comprise raw events stored in the same type of file (e.g., HDFS). In the illustrated embodiment, the auditor (310) retrieves a batch file from buffer (312). In one embodiment, this batch file is associated with a fixed period. In some embodiments, this fixed period is represented in the filename or in metadata. Using this fixed period, the auditor (310) then retrieves a set of events from the raw event storage (302) matching the fixed period. In one embodiment, the periods of the buffer (312) and the raw event storage (302) are synchronized. In this embodiment, the auditor (310) then retrieves a single file from the raw event storage (302) that matches the period pulled from the buffer (312). In other embodiments, the auditor (310) may execute a MapReduce job to identify events split across multiple files. In this embodiment, the periods represented by files in the raw event storage are not synchronized with the buffer (312). Thus, the auditor (310) must patch together portions of multiple files stored in raw events storage (302) to rebuild a period of raw events matching the period stored in the buffer (312). In either event, the auditor (310) receives two files containing raw events from raw event storage (302) and a set of processed events for the same period stored in buffer (312).

In general, the auditor (310) ensures that each processed event in the buffer (312) matches a raw event stored in raw event storage (302). Thus, the auditor (310) ensures that no events were dropped during processing by the stream processor (304) and that no events were duplicated. If the auditor (310) detects that an event exists in the raw event storage (302) and does not exist in the corresponding buffer (312) output, the auditor (310) sends the missing event back to the stream processor (304) for re-processing.

The stream processor (304) reprocesses the events using the same processing logic used to process the event originally. In some embodiments, the stream processor (304) may add a field to the reprocessed event to indicate it was (or will be) reprocessed. In most embodiments, the stream processor (304) will properly process the event during re-processing. However, if the stream processor (304) cannot reprocess the event (as detected by the auditor, 310), the system (300) may gracefully handle the error. In one embodiment, the auditor (310) can itself add a field to the raw event indicating that the raw event was not processed and write the event along with the processed events.

After any missing events are re-processed, the auditor (310) writes the final output to the fact feed (210). Since spooler (308), buffer (312) and auditor (310) operate on batches of events, the fact feed (210) comprises a simulated batch data store. In some embodiments, the auditor (310) will delay writing to the fact feed (210) until any events are re-processed. In other embodiments, the auditor (310) writes the partially final output file to the fact feed (210) and updates the file upon completing the re-processing.

FIG. 4 is a block diagram illustrating a core pipeline according to some embodiments of the disclosure. Various elements of FIG. 4 are described in the previous figures and those elements are not described again herein.

In the illustrated embodiment, a stream processor (304) receives events from a data highway (204). In the illustrated embodiment, the stream processor (304) receives events from the data highway (204) via an initial spout (404). The stream processor (304) as illustrated includes two separate spouts (404, 422). In the illustrated embodiment, the stream processor (304) utilizes two spouts (404, 422) to distinguish between event streams (e.g., original versus re-processing). In the illustrated embodiment, the stream processor (304) topology can be configured to add additional extract-transform-load (ETL) steps (e.g., bolts) for the reprocessing spout (422) versus events received via the initial spout (404).

In the illustrated embodiment, the stream processor (304) processes events received via spouts (404, 422) via ETL logic (406). As described previously, ETL logic (406) may comprise a series of linear processing stages (e.g., bolts) for each operation performed on events.

In the illustrated embodiment, the ETL logic (406) outputs processed events to two streaming queues (408a, 408b). In one embodiment, the two queues (408a, 408b) store varying types of event data. As illustrated, a first queue (408a) is accessed by a partial stream consumer system (424). In the illustrated embodiment, the first queue (408a) may be filled by the ETL logic (406) prior to the execution of all processing steps. In the illustrated embodiment, the ETL logic (406) may eschew more complicated and time-consuming operations and interrupt the full processing steps to provide low latency operations. In some embodiments, this bypassing includes foregoing joins, traffic protection, annotation, etc. In the illustrated embodiment, the partial stream consumer system (424) may comprise a fast feedback system such as budget or pacing systems that are willing to accept a certain level of error. Thus, the first queue (408a) provides "best effort" data wherein the system (400) does not guarantee the accuracy of the data. In practice, however, the system (400) will generally process a large amount of data correctly enough that the best effort data in the first queue (408a) is of value to the partial stream consumer system (424).

In contrast to the first queue (408a), the stream processor (302) fills the second queue (408b) with the results of the full ETL processing. Thus, the ETL logic (406) fully processes the data in the second queue (408b), including performing joins, deduplication, annotations, fraud detection, traffic protection, etc. In one embodiment, the complete streaming consumer system (426) access second queue (408b) can retrieve data that achieves close to exactly once performance (that is, no events are dropped or duplicated) since the data was fully processed in the ETL logic (406). In some embodiments, this performance will meet "exactly once" performance. However, in other embodiments, the output of the second queue (408b) is still subject to inaccuracies caused by the underlying messaging queue. In some embodiments, a near exactly one completeness from second queue (408b) comprises a 99.9% guarantee of completeness. Such a confidence level is often suitable for applications such as real-time reporting.

Finally, as illustrated and discussed above, a final fact feed (210) meets exactly once requirements of all systems and provide batch-like performance. That is, data in the fact feed (210) will be fully de-duplicated and ensure that no events were dropped. As discussed in FIG. 3, this guarantee is implemented via spooler (308) and auditor (310). Auditor (310) is described more fully in FIG. 3 and those details are incorporated herein by reference.

In the illustrated embodiment, the spooler (308) is illustrated as including deduplication writer (412), deduplication store (414), and a fact feed writer (416).

In the illustrated embodiment, the deduplication writer (412) receives events from the second queue (408b). An event is uniquely identified by an event identifier (event id). The spooler (308) considers two events as duplicates if they have the same event identifier. Events may include additional, but standardized, fields such as a type, timestamp, join status, and secondary event identifiers.

The deduplication writer (412) writes each of the events to deduplication store (414). In one embodiment, the store (414) comprises a database such as HBase or a similar storage device. Upon receiving an event, the writer (412) analyzes the fields associated with the event. If the event includes one or more secondary event identifiers, the writer (412) will retrieve all events stored in store (414) matching these secondary event identifiers and update the entries to indicate that a primary event is available (i.e., will be written to the store, 414). The writer (412) will then write the received event to the store (414) using the event identifier as a key. In some embodiments, a salt will be added to the event identifier before using the event identifier as a key. In the illustrated embodiment, the writer (412) will not write the event if the event has secondary event identifiers and the initial step of updating the secondary events is not successful. In some embodiments, the writer (412) will serialize the event prior to writing the event as a value for the event identifier key.

In the illustrated embodiment, the deduplication store (414) stores events per batch period and per type of event. In some embodiments, the store (414) creates a new table for each event type and batch period pair for a fixed period of time (e.g., one week) since the current time. The store (414) additionally includes a pruning process that periodically inspects the created tables and removes older tables not occurring within the current period (e.g., older than one week). In some embodiments, the auditor (310) initiates this pruning process upon confirming that all data for a given period is certified.

The spooler (308) additionally includes a fact feed writer (416). In the illustrated embodiment, the fact feed writer (416) waits for a signal from auditor (310) to trigger a spooling process to write the events in the store (414) to the fact feed (210) for a particular batch period and event type. In one embodiment, the fact feed writer (416) includes an internal web server that comprises a Hypertext Transfer Protocol (HTTP) endpoint that is called by the auditor (310) to initiate the spooling. As described above, once the auditor (310) confirms that the data in the store (414) is fully processed and certified, the auditor (310) issues a call to the endpoint which causes the writer (416) to start writing to the fact feed (210). In one embodiment, the writer (416) executes a distributed process routine to per from a full table scan of the store (414) and write the events to the fact feed (210).

For each event in the store (414), the writer (416) will deduplicate the events prior to writing. In one embodiment, the writer (416) will first determine if an event has one or more secondary identifiers and whether that secondary event was successfully joined to the event under inspection. If so, the writer (416) will select the most recent secondary event and write that joined event to the fact feed (210). Alternatively, if the event under inspection indicates that a primary event is available, the writer (416) will skip the event (since a root event exists). Finally, if the event does not have secondary identifiers and the primary event flag is not raised, the writer (416) will write out the event as failed since the secondary event was not properly joined.

In some embodiments, low-latency consumers may not want to or be able to consume a low-latency stream (408a) directly. For example, the stream might contain personally-identifiable fields that need to be restricted to specific consumers or the final consumer may need additional processing of events for their use. As another example, the consumer may be consuming from many sources and is unable to handle different event schemas of their various inputs. In these scenarios, the system (400) provides derived low-latency streams, or "filters", that have all of the events (or at least all of the desired events) as the second queue (408b) stream. Each filter can be associated with a quality of service (QoS) level. In the illustrated embodiment, three QoS levels are provided: "at least once", "at most once", and "at least once with tag."

A filter having an at least once QoS outputs every event but potentially includes duplicates. In the event of a system (400) failure, the at least once filter resends previously-sent events. A filter having an at most once QoS does not include duplicates but potentially drops data. The at most once filter does not reprocess the same event batch more than once.

Finally, a filter having an at least once with tag QoS generates batch dataset wherein each event in the batch includes tags allowing downstream consumer systems to detect duplicates. In one embodiment, this filter includes a stream topic, partition, and a "cursor," that can be used to detect duplicates. In some embodiments, Kafka offsets and CMS Message Ids could provide such cursors. The consumer system is then responsible for keeping track of the last cursor it processed, and discard any subsequent batch with a cursor less than or equal the new batch. This requires a 1-to-1 correspondence between batches in the pipeline and derived streams.

Each of the above filters may be implemented via a separate stream processor (e.g., stream topology). In these embodiments, the filters utilize an output of the system (400) (e.g., queues 408a, 408b) as an input source (e.g., spout) and output the filtered feed.

For the at least one filter, the filter will always back up in the event of a failure and resend any events that cannot be confirmed as being successfully delivered. This filter uses the initial spout (404) and streaming queue (408b) as inputs (e.g., filter spouts). In this embodiment, the consumer is configured to not report its current read offset. When sending data, the filter spout includes the current events cursor in a message identifier. The receiver (e.g., sink) would then acknowledge the received message only after successfully delivering the filtered output to the derived stream. In some embodiments, the receiver could also use the existing spooler logic to fail a tuple if it can't deliver it, and then continue to fail subsequent tuples until it receives a restarting indication from the spout. Upon receipt of an acknowledgement, the filter spout would commit that cursor back to the system (400). On receipt of a fail of a sent event, the filter spout would back up the received offset to a cursor at or before the last acknowledged event and restart sending.

For the at most once filter, the filter spout enables automatically committing offsets in a stream queue. By turning on auto-commitment, the filter spout only transmits a given event once and does not re-transmit events causing duplication.

For the at least once with tag filter, the at least one filter mechanism can be used. However, in this filter, tags will be added prior to transmission to the consumer. These tags include the cursor, as described above, but also a topic and partition if they aren't implied by the derived stream's partition.

In some embodiments, an exactly once filter may be implemented based on the at least once with tag filter. In this embodiment, a receipt acknowledgement message can be saved as reliably as the system (400) can support. Additionally, the filter, on receipt of the acknowledgement, could update some persistent record of the delivered cursor. However, persisting this data may be computationally expensive and require significant storage. In an alternative embodiment, given the at least once with tag filter, the filter, on a start-up or after a failure, can access the output stream and read back a plurality of last-sent messages in the queue. The filter could then determine the tag of the last message written, then discard any replayed events from the spout until it was caught up, thus ensuring exactly once delivery.

Figure 5:
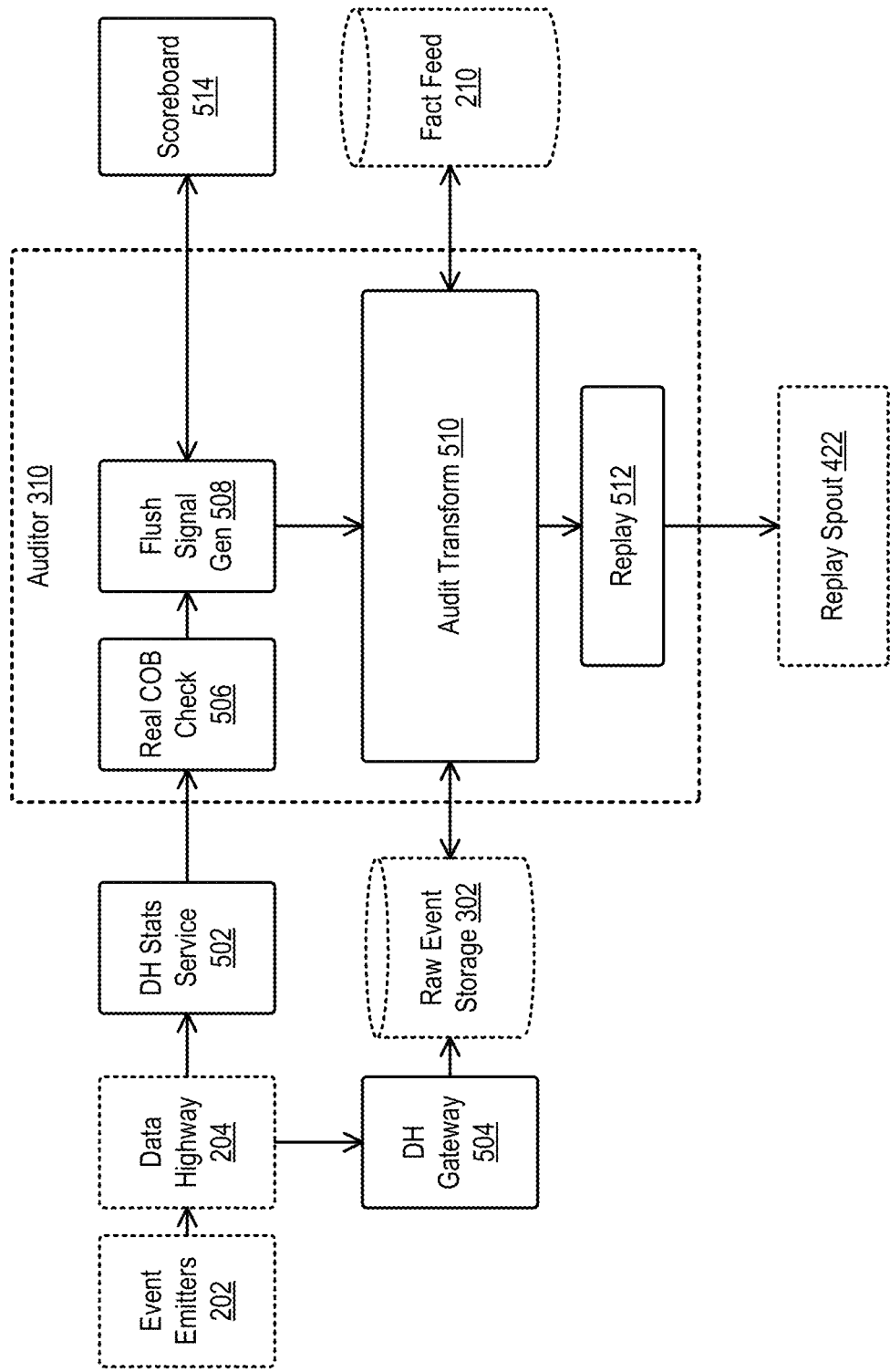
FIG. 5 is a block diagram illustrating a core pipeline according to some embodiments of the disclosure.

FIG. 5 is a block diagram illustrating a core pipeline according to some embodiments of the disclosure. Various elements of FIG. 5 are described in the previous figures and those elements are not described again herein.

In the illustrated embodiment, a data highway (204) communicates with a data highway stats service (502) and a gateway (504). In the illustrated embodiment, the gateway (504) manages the writing of all events transported over the data highway (204) into raw events storage (302). In some embodiments, the gateway (504) copies each event received over the data highway (204) into the raw events storage (302). In some embodiments, the gateway (504) may perform minimal processing on the raw events such as transport duplicate detection prior to writing. However, in the illustrated embodiment, any processing performed by the gateway (504) must also be performed on events input into the stream processor (304). Thus, in some embodiments, the gateway (504) may provide events to both the raw events storage (302) and stream processor (304).

The stats service (502) comprises a separate process that monitors the data highway (204). In the illustrated embodiment, the stats service (502) measures the operations of the data highway (204) and provides a network interface for accessing those operations. In the illustrated embodiment, the stats service (502) provides an indication of when a close of books (COB) has occurred. As used herein, COB refers to a property of a given data set and batch time. The property initially starts out at false, and is set to true after a given set of validations have occurred to indicate that all necessary data attributed to the given batch time has been collected and published in the feed. The data highway (204) itself does not publish close of books, rather, it provides metadata to allow a pipeline to define its own close of books definition. This also implies that close of books is not necessarily defined as a 100% data complete state. For example, revenue pipelines will tend to have very strict close of books definitions, but an analytics pipeline may be easily satisfied with a 90% to 95% close of books definition. In the illustrated embodiment, the stats service (502) implements the pipelines COB requirements and signals to the auditor (310) when the COB has occurred.

The auditor (310) includes a real (or raw) COB check process (506). The real COB check process (506) polls the stats service (502) to identify the total number of events in flight versus committed to the raw event storage (302). Stats from previous time periods, stats by emitter host, among others can be used to determine the completeness of the raw events storage (302). After the decision is made to certify the data, a list of files (LOF) file is written to a corresponding directory for the certified batch. The LOF file comprises a snapshot of the records in the current data highway delivery directory that are now certified. Downstream consumers of the raw data use this file to know which files were certified by the COB checker. It should be noted that not all pipelines certify based on 100% data completeness. Some pipelines may have a lower threshold. By capturing the state of the directory at the moment it is certified, late arriving data can be detected easily through a comparison of the directory structure (e.g., a name node scan). By having consumers utilize the LOF file as a filter on reading from the directory, different processes reading the same source can be trusted to produce the same results, even if late data arrives in between certification and processing (i.e., the LOF eliminates race conditions).

In the illustrated embodiment, and in contrast to existing pipelines, the real COB check process (506) passes control to the fact COB check process executing within the audit transform logic (510) of the auditor (310) upon successful certification of the raw event data from stats service (502), in addition to persisting the LOF file.

Upon detecting a COB completion, the real COB check process (506) causes the flush signal generator (508) to flush all events in the stream processor using scoreboard (514). In the illustrated embodiment, the scoreboard (514) comprises a metadata table stored in a database (e.g., a distributed database) that tracks the status of events in each batch interval. The scoreboard (514) is maintained by the auditor (310) and serves many purposes beyond the freeze and flush logic. For example, dashboards and site engineer tools may use the scoreboard (514) to monitor the health of the system. The scoreboard (514), for example, can identify the table name for deduplication tables assigned per batch interval. In the illustrated embodiment, the scoreboard (514) comprises a durable key-value store that scales to a large number of reads and writes. One example of such a key-value store is Apache® HBase. Details of flushing the stream processor and using the scoreboard are discussed more fully in the description of FIG. 6E.

After flushing the stream processor, the flush signal generator (508) signals the audit transform logic (510) to initiate a fact COB check process.

In the illustrated embodiment, the audit transform logic (510) determines the relative completeness of the spooler (308) output against the raw events emitted by the data highway (204). The audit transform logic (510) may execute once the real COB check process (506) completes, and the spooler (308) has dumped its dedupe store (414) for the given event type and batch interval.

In some embodiments, the data highway (204) organizes its events by the emitter timestamp stored in the data highway header file, which may be distinct from the business timestamp stored within the message itself by the emitter (202). Therefore, in some embodiments, all modules use the emitter timestamp for time partitioning events.

As an example, an ad server event emitter may receive an ad call at 23:59:59.975 on Dec. 31, 2015. The ad server would consider this to be in the 5-minute bucket 201512312355. Now suppose that data highway is called 30 milliseconds later at 00:00:00.005 on Jan. 1, 2016. The data highway will record the emitter timestamp at this time, and will bucket the event into the 5-minute interval 201601010000 and store on grid in the corresponding directory. This difference represents boundary slippage between the emitter time and business time. The data highway spout for the stream processor exposes the original message containing the business time as well as the data highway timestamp. All COB processes thus use the data highway timestamp, as this is what determines where on the grid the corresponding grid delivery will occur.

In the illustrated embodiment, the methods used to detect the fact COB include some bounds since the result of a failure is a replay operation. Under normal circumstances, events will arrive in the processed feeds well ahead of the raw files and that replay is there to handle small numbers of events lost due to various issues. If a large discrepancy is found, it is most likely due to some sort of catastrophic failure of some portion of the system; for example, an outage where the system is brought up after a critical failure. As it starts, the data highway will begin spooling events into the system. While catching up, the replay component (512) should not add to the problem by spooling the exact same records back into the pipeline. For this reason, the audit transform logic (510) should probably contain some or all of the following heuristics:

1. Do not initiate replay if more than X % of the data is missing, where X is configured by the system operator.
2. Do not initiate replay if data highway is spooling.
3. Do not initiate replay if events for the current window are still in-flight within the system.
4. Do not initiate replay if the system is signaling a chronic condition that is causing events to be dropped.

If the audit transform logic (510) does not initiate a replay, the audit transform logic (510) marks the processed events as certified and publishes the certified events to fact feed (210). In one embodiment, the audit transform logic (510) can simply copy the processed data to a preconfigured published location (versus re-writing each individual event).

In contrast, if the audit transform logic (510) identifies missing events meeting some or all of the above heuristics, the audit transform logic (510) will transmit the missing events to replay component (512). The replay component (512) will processed the missing events (as described in FIG. 6D) and transmit the missing events for re-processing by the stream processor via replay spout (422).

In the illustrated embodiment, the system illustrates a critical path between the detection of COB for a data highway and the spooling of events to a file system to ensure that no events are processed during this time. In some embodiments, incrementing the replay level for an interval involves more than just incrementing an integer (as described in FIG. 6D); there is also an inherent flush. Every time the state of an interval increments, there is a need to flush any in-flight events for that interval in the pipeline, before the audit can be started.

In general, each bolt in the streaming topology will only pass on events that fully succeed. But, because of performance reasons, the stream processor (304) may be retaining events temporarily to make certain batch operations work properly. This means that the auditor needs to ensure that no events for a given time interval are being held anywhere in the pipeline that will cause them to be queued to the streaming queues (408a, 408b). In a first embodiment, the auditor (310) requires the stream processor (304) to process the replay level change command as a message. The auditor (310) posts a message to the stream processor (304) indicating that it needed to set the replay level to a new value. This message would ripple through the entire primary path of the stream processor (304). When the message is received, a processing stage (e.g., bolt) would update its internal flags so that new messages are filtered properly. The message would be queued just like normal messages, so that the next processing stage in the path is not processed until a flush is performed on the queue. However, in this embodiment, there is no guarantee that the message will propagate to every processing stage during a failure scenario, unless the entire system is hardened to at least once for these flushing commands.

Figure 6A:
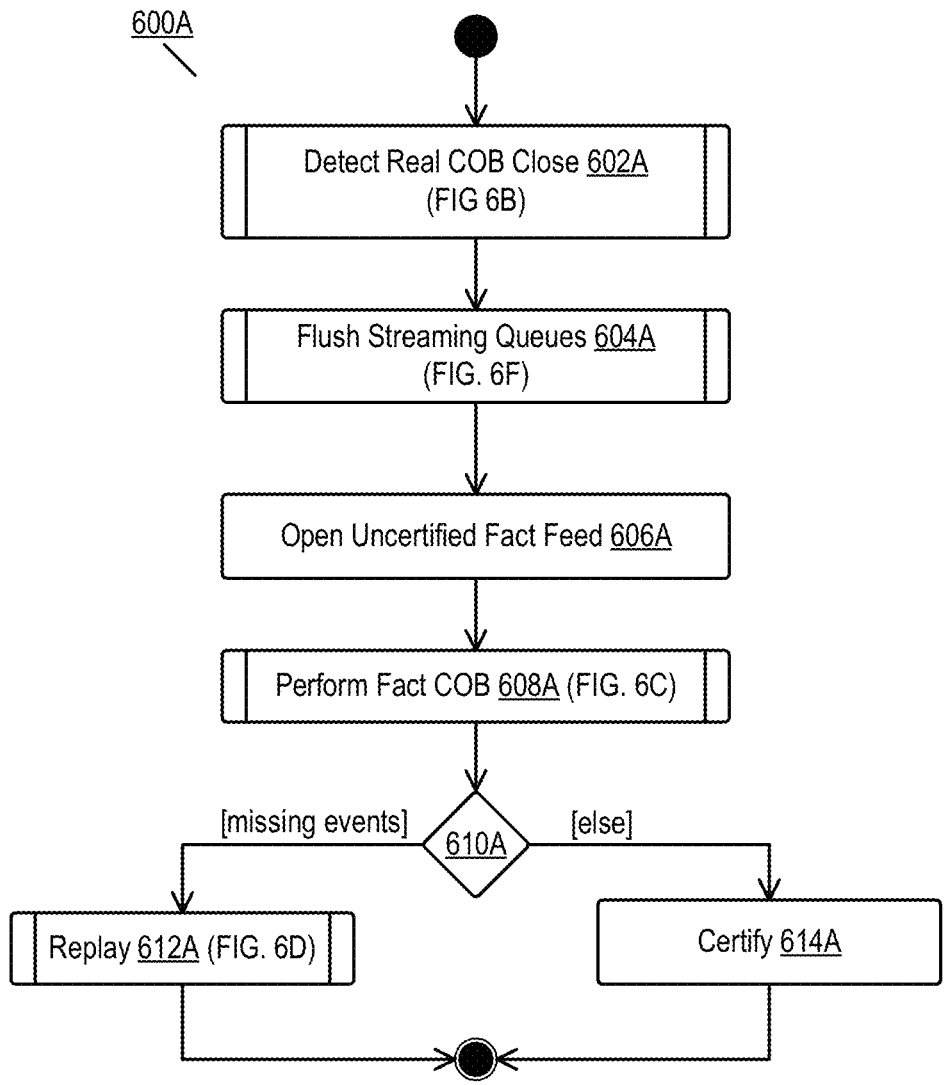
FIG. 6A is a flow diagram illustrating a method for certifying a streaming pipeline according to some embodiments of the disclosure.
Figure 6B:
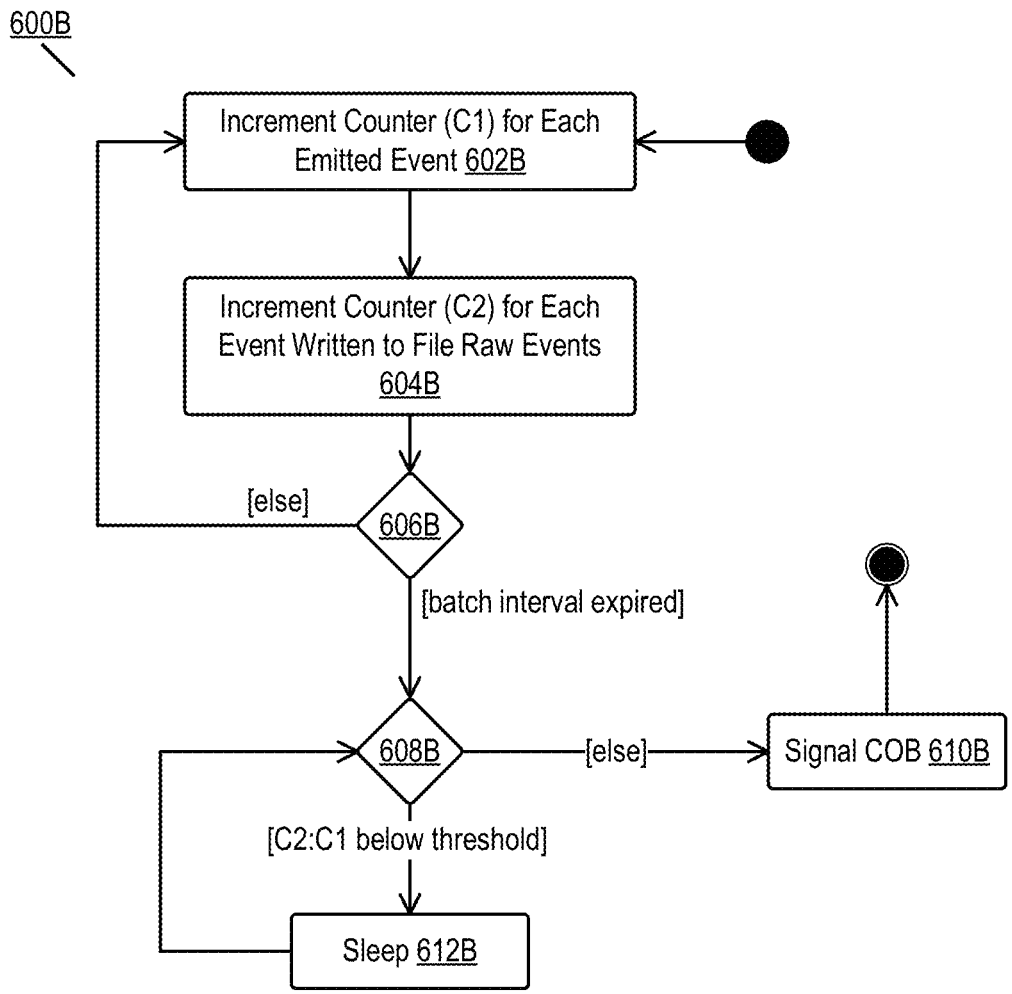
FIG. 6B is a flow diagram illustrating a method for performing a real COB check according to some embodiments of the disclosure.
Figure 6C:
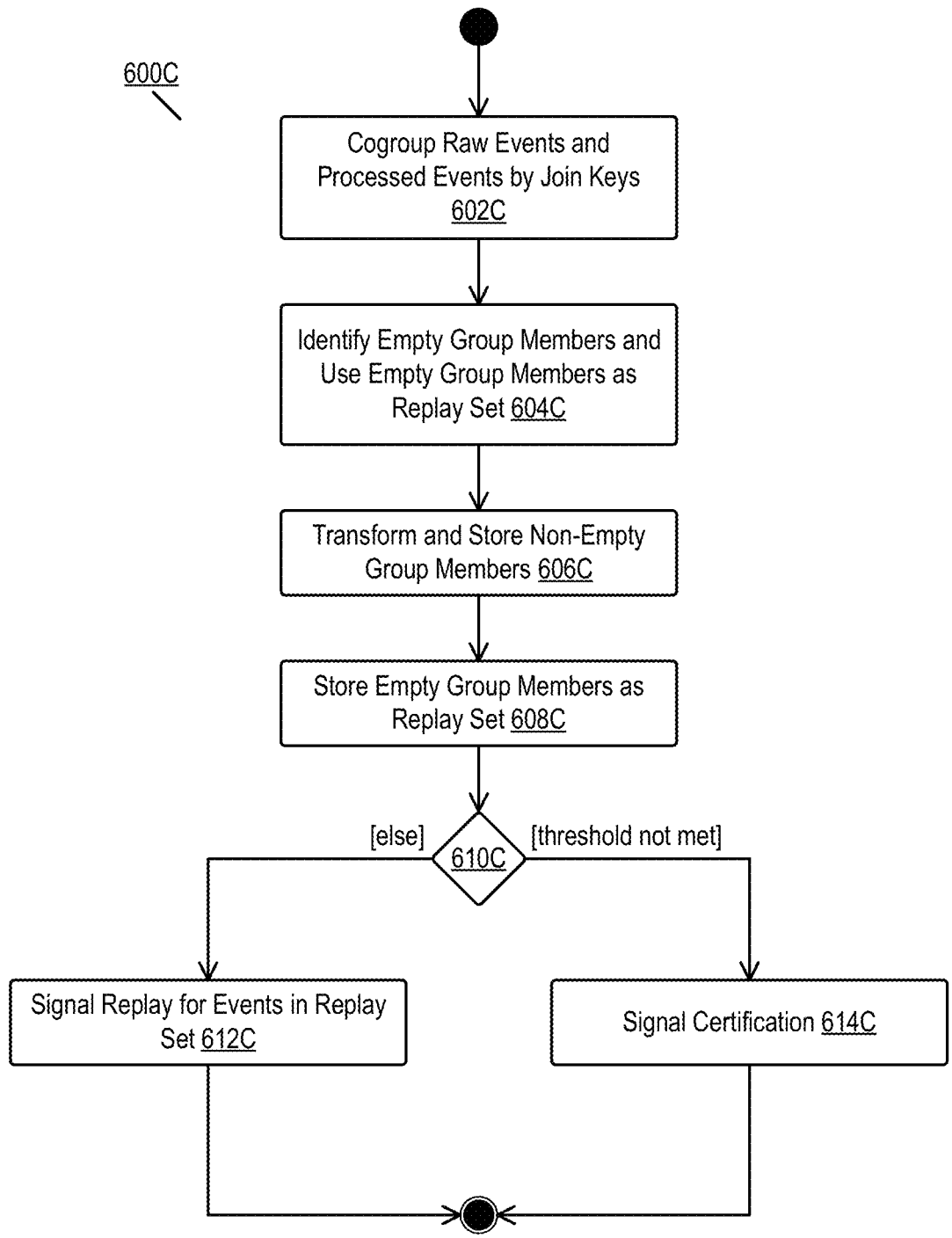
FIG. 6C is a flow diagram illustrating a method for auditing and transforming an event feed according to some embodiments of the disclosure.
Figure 6D:
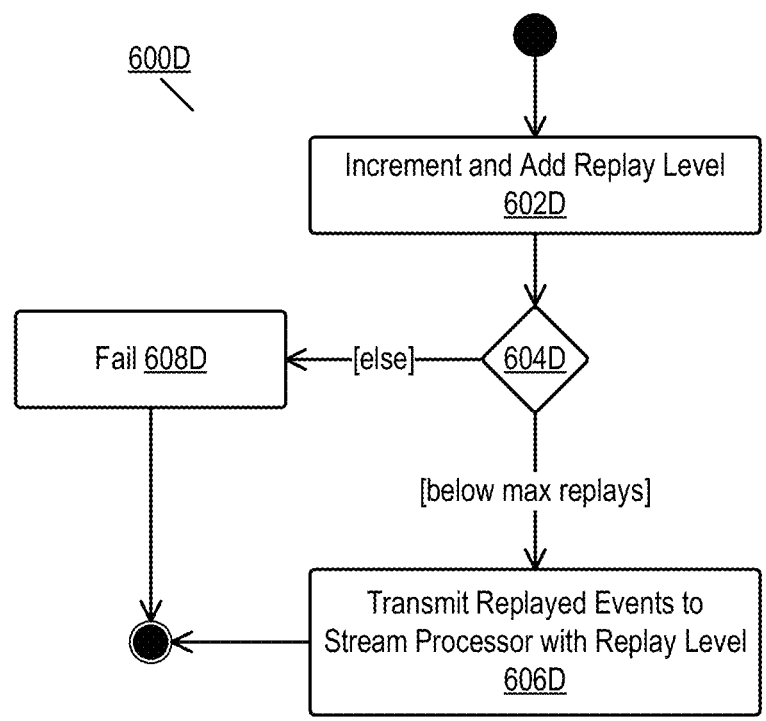
FIG. 6D is a flow diagram illustrating a method for replaying missing events according to some embodiments of the disclosure.
Figure 6E:
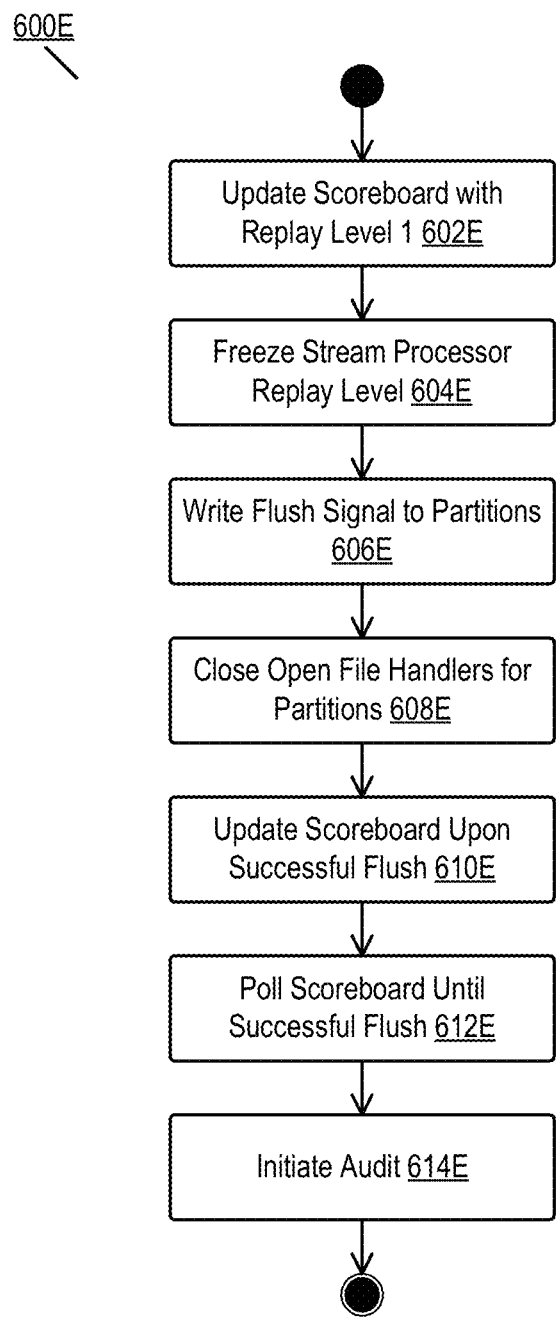
FIG. 6E is a flow diagram illustrating a method for operating a scoreboard according to some embodiments of the disclosure.

In the alternative embodiment depicted in FIG. 6E, the method (600e) flushes the queue (408b) and spooler (308) only. A streaming queue (408b) provides a sharded message queue, where each partition provides a sequenced queue of messages. Producers (e.g., the deduplication bolt or stream processor) identify the partition that they will write messages to, and consumers (e.g., the spooler) identify the partitions that they will read. Two consumers in the same group cannot consume from the same partition. Technically producers may overlap, but for network efficiency, producers will generally own a group or partitions that they send to, to avoid network spray and larger network packets. Each partition is a queue of messages. Across the partition, the producer is moving a write pointer with each new message queued, and the consumer is following it with a read pointer. The number of partitions is generally set to be larger than the maximum number of producers or consumers that the pipeline believes it will need to allow for growth.

In the illustrated embodiments, the deduplication bolt persists the state of the various filter masks that it is implementing. The scoreboard (514) satisfies this requirement; however, the deduplication bolt sends a signal on the transition of this state. If a deduplication bolt goes down, followed shortly thereafter by the auditor setting the filter, when the deduplication bolt comes up, it will notice that the filter is in place, but be unaware that this is a transition from the last state the bolt had before it went down. Thus, no signal will be relayed. To address this, the auditor can record an attempt counter in the scoreboard (514). In this embodiment, the deduplication bolt not only compares the replay level, but also the attempt count to its internal state. Any time the attempt count changes, the deduplication bolt should resend the flush signal to the streaming queue (408b).

The spooler (308) orders the update of the scoreboard (514) so that it occurs after the feed files are closed. In the case that the spooler (308) goes down after the files are closed, but before the scoreboard (514) is updated, that is acceptable because the audit will be prevented from starting. When the spooler (308) comes back up, it will restore its state from the filesystem, including the offset of the streaming queue (408b), which may be after the signal to flush. The auditor (310) may simply timeout and retry until the spooler (308) can update the scoreboard (514).

The auditor (310) itself could potentially fail during an audit operation. In some embodiments, the auditor (310) may choose to use the scoreboard (514) as a way to persist its state so that it can easily recover from a failure.

The scoreboard (514) design utilizes the following data elements per batch interval. First, the scoreboard (514) includes a replay level that represents the level of replay allowed by a filter. A level of zero (0) indicates that any record is allowed. A level of one (1) indicates that only replayed events are allowed to pass. A level of two (2) indicates that only events from the second replay are allowed and so on. Second, the scoreboard (514) includes an auditor flush attempt element that comprises a counter that indicates the attempt number of the auditor. It should be initialized to one (1) whenever the auditor raises the current replay level. Third, the scoreboard (514) includes a per-partition flush level element that indicates the replay level that the spooler (308) has successfully flushed. It is written by the spooler (308). In one embodiment, each partition has an independent column so that multiple parallel writes do not interfere with one another.

Finally, in some embodiments, each the deduplication bolt requires that every streaming queue (408b) partition be assigned to a unique deduplication bolt. This design differs from most streaming queue producer designs where partitions are written round robin fashion. This design alleviates the need to track individual queue writer threads and ensures that every thread is flushed over every partition greatly increasing the bookkeeping in the scoreboard (514).

Additional detail regarding the above components are described more fully in the following FIGS. 6A through 6E.

FIG. 6A is a flow diagram illustrating a method for certifying a streaming pipeline according to some embodiments of the disclosure.

In step 602a, the method (600a) detects a real COB close. In one embodiment, step 602a is performed by the real COB check process (506) described previously. The real COB check process (506) polls the stats service (502) to identify the total number of events in flight versus committed to the raw event storage (302). Stats from previous time periods, stats by emitter host, among others can be used to determine the completeness of the raw events storage (302). After the decision is made to certify the data, a list of files (LOF) file is written to a corresponding directory for the certified batch. The LOF file comprises a snapshot of the records in the current data highway delivery directory that are now certified. Downstream consumers of the raw data use this file to know which files were certified by the COB checker. It should be noted that not all pipelines certify based on 100% data completeness. Some pipelines may have a lower threshold. By capturing the state of the directory at the moment it is certified, late arriving data can be detected easily through a comparison of the directory structure (e.g., a name node scan). By having consumers utilize the LOF file as a filter on reading from the directory, different processes reading the same source can be trusted to produce the same results, even if late data arrives in between certification and processing (i.e., the LOF eliminates race conditions). Further details of step 602a are described more fully in the description of FIG. 6B.

In step 604a, the method (600a) flushes the streaming queues (408a, 408b) of the system. Details of flushing the streaming queues is described more fully in FIG. 6E and those details are not repeated herein. In brief, the auditor signals to the stream processor that the processor should flush the streaming queues. In response, the spooler closes any file handles opened for the flushed batch interval and updates the scoreboard. The method (600a) then polls the scoreboard to determine when the initiate further auditing.

In step 606a, the method (600a) opens an uncertified fact feed. In one embodiment, this fact feed comprises the fact feed written by the spooler during streaming of results into the spooler from the streaming queues. As described briefly above, the uncertified fact feed includes all facts flushed during the execution of step 604a.

In step 608a, the method (600a) performs a fact COB check. Details of this step are provided in more detail in FIG. 6C and those details are not repeated herein. In brief, the method (600a) steps through both the raw events stored in raw event storage and events in the uncertified fact feed to confirm a one-to-one correspondence between raw events and processed events in the fact feed.

In step 610a, the method (600a) determines if any events are missing in the uncertified fact feed.

In step 614a, the method (600a) replays the missing events (i.e., events in the raw events that do not correspond to events in the processed events). In the illustrated embodiment, the method (600a) streams the missing events to the replay spout (422) for re-processing through the pipeline. In the illustrated embodiment, the method (600a) annotates the missing events with a replay level and adjusts the stream processor to ignore events with a replay level below a threshold. In the illustrated embodiment, after the replayed events are processed by the stream processor (304), the method (600a) increments the replay level and compares the raw events to the processed replayed events. The method (600a) may perform this loop for as many replay levels as implemented, until all replayed events are processed.

In step 614a, the method (600a) certifies and publishes the processed events (including originally processed and replayed events). In some embodiments, this may comprise copying the file storing the processed events to a specific directory. In contrast, when executing step 614a, the method (600a) may write the entire dataset to a new directory, thus incurring significant overhead. In some embodiments, the method (600a) iterates through each key of the raw and processed events. Thus, the method (600a) can quickly determine if a duplicate exists in the processed facts during this key scan operation. If the method (600a) determines that no such duplicate exists, the auditor can forgo duplicate processing and simply copy the processed events to a designated location. Using HDFS as an example, the method (600a) can simply copy the file associated with the processed facts to a designed folder for certified events.

In some embodiments, the same event is emitted from the data highway more than once. Further, additional copies of the original event may not fall within the same batch interval, and the duplicate events will appear in the certified event file. If the duplicated events fall within the same batch interval the stream processor treats the duplicate the same as a duplicated event and discards the extra(s), The auditor can easily detect the duplicate in its data highway input, so is satisfied when it only sees one copy of the event from the stream processor. If the duplicates are in different batch intervals, however, the auditor can't tell (without a lot of extra overhead) that an event in data highway input is a duplicate counted in another batch interval, so if it doesn't see the event from the topology it will request a replay. But because it's a duplicate, the event shouldn't be counted. In this case, the stream processor will still emit the event in the second batch interval (one copy only), but will mark it as "invalid duplicate." That will prevent the event from being counted for any business purpose, but prevents the auditor from requesting a replay.

FIG. 6B is a flow diagram illustrating a method for performing a real COB check according to some embodiments of the disclosure.

In step 602b, the method (600b) increments a first counter (C1) for each event emitted by the data highway (204). In the illustrated embodiment, the emitted events comprise raw events received directly from event emitters over the data highway. In the illustrated embodiment, the events counted in step 602b are not processed in any manner.

In step 604b, the method (600b) increments a second counter (C2) for each event written to the raw event storage (302). In one embodiment, the raw events may be lightly processed by a gateway or other device and then persisted to a distributed file system (e.g., raw event storage, 302). Steps 602b and 604b form a traditional batch pipeline whereby events are "dumped" to a raw storage location and subsequently processed at batch intervals.

In step 606b, the method (600b) determines if a batch interval has expired. In the illustrated embodiment, the batch interval is configurable but comprises a fixed period representing a simulated batch. In some embodiments, the interval may be selected to support existing batch pipelines. As described above, raw events storage (302) may form the data source for existing batch pipelines. Thus, in the illustrated embodiment, the interval may be selected to meet the requirements of these pipelines.

If the interval has not expired (i.e., raw events for a given interval are still being received), the method (600b) continues to increment the two counters (C1 and C2) in steps 602b, 604b, respectively.

In step 608b, the method (600b) has determined that the batch interval expired. In response, the method (600b) then determines whether the ratio of C2 and C1 is less than a configured threshold. If there is a perfect correspondence between events received from the data highway and events written to the raw event storage, this ratio will be equal to one. However, in some embodiments, the value of C2 will be less than C1, resulting in a ratio under one. Expressed another way, the ratio represents the percentage of raw events successfully written to the raw events storage.

In some embodiments, the method (600b) will signal a COB (step 610b) if the ratio is above the threshold. In some embodiments, this threshold is slightly below one indicating an acceptance of some data loss.

Alternatively, if the method (600b) determines that the ratio is below the signaling threshold, the method (600b) will sleep for a period of time (step 612b) before checking the ratio again. In some embodiments, the method (600b) will continue sleeping until the value of the ratio exceeds the threshold. In other embodiments, the method (600b) will time out if the threshold is not met within a preconfigured sleep interval. In some embodiments, the sleep interval is chosen based on the average write time to the raw events storage. In this manner, steps 608b and 612b "wait" for any writes pending as of the close of the batch interval, increasing the number of events captured in the batch interval.

FIG. 6C is a flow diagram illustrating a method for auditing and transforming an event feed according to some embodiments of the disclosure.

In step 602c, the method (600a) cogroups raw events and processed events by join keys. In the illustrated embodiment, raw events and processed events retain a join key throughout stream processing. In the illustrated embodiment, raw events and processed events are stored in separate data files (e.g., HDFS files). In this embodiment, the method (600a) loads each file into a separate relation. The method (600a) then combines the files and groups each by the shared join key.

The cogroup command in the Pig programming language (or similar commands) converts the two relations into a new relation having the join key as the key and separate bags of values for each relation as the values. If a given relation (e.g., processed or raw events) does not have an event with the join key, the bag for that relation will be empty.

In step 604c, the method (600c) identifies any join keys mapped to an empty event set and uses those events as a replay set. In the illustrated embodiment, the processing in step 602c generates a new relation whereby a join key is mapped to two iterable columns, one for raw events and the other for processed events. If both event sets have an event with the join key both cells are occupied. However, if one event set does not include an event with the join key, the cell will be empty. The following example illustrates the result of a cogroup operation on two event sets:

TABLE 1

| JoinKey | Raw | Processed |
|---------|-----|-----------|
| A | X1 | X1 |
| B | X2 | |
| C | | X3 |

In the above Table 1, event X1 was found in both event sets using a join key "A." In contrast, events X2 and X3 only appeared in the raw events and processed events, respectively. Thus, in step 604c, the method (600c) would identify X2 and, in some embodiments, X3 as events in a replay set.

In step 606c, the method (600c) transforms and stores non-empty group members. In the illustrated embodiment, the method (600a) splits the cogroup relation generated in step 602c based on the presence of empty relation cells. The segment that includes all non-empty values represents properly processed events. In some embodiments, the method (600a) transforms these events by annotating the events as certified. In some embodiments, the method (600a) will write the certified events to a designated area in a distributed file system.

In step 608c, the method (600c) then writes the empty group members as a replay set. In some embodiments, the method (600c) writes the replay set to a separate designated location in the distributed file system. In some embodiments, the use of two separate areas enables a combination of the replay set (after a replay) with the non-empty group members written in step 606c, which increases the throughput of the system by avoiding unnecessary copying and duplication.

In step 610c, the method (600c) determines if the size of the replay set exceeds a configured replay threshold. In some embodiments, this configured replay threshold can be set based on the needs of the system. If the size of the missing event set does not exceed a replay threshold, the method (600c) certifies the replay set as well as the non-empty group member set (614c). Alternatively, if the method (600c) determines that the size of the replay set exceeds the replay threshold, the method (600c) initiates a replay of the replay set (step 612c).

FIG. 6D is a flow diagram illustrating a method for replaying missing events according to some embodiments of the disclosure.

In step 602d, the method (600d) increments and adds a replay level to a replay set. In one embodiment, the method (600d) can be implemented as a distributed processing job, such as a MapReduce job. In one embodiment, the method (600d) uses the replay set created by the method 600c as the input to the job. In the illustrated embodiment, a replay level is tracked via a counter. The counter is initialized to zero prior to replaying any events for a given batch interval. For each replay, the level is incremented until a maximum level is reached (at which time an error is raised) or all events are successfully processed within the replay threshold. In the illustrated embodiment, the replay level is added via dimensional annotation with the replay set events. In another embodiment, the replay level may be added as an HTTP header included in the transmission of the replay set to the stream processor.

In step 604d, the method (600d) determines whether the replay level is equal to a max replay amount. As described above, this replay level may be set by the system operator.

In step 608d, the method (600d) fails if the replay level exceeds the max replay amount. In some embodiments, the method (600d) may move the replay set to a dedicated storage location for manual analysis by a site engineer as part of failing.

In step 610d, if the method (600d) determines that the replay level is below the max replay amount, the method (600d) transmits the replayed events to the stream processor with the replay level. As described above, this transmission may comprise an HTTP transmission to the replay spout (422). In some embodiments, the replay level is included in the HTTP header and annotated by the replay spout. In other embodiments, the replay level can be annotated directly on each event.

After receiving the replay set, the stream processor (304) processes the replay set as an event stream for the batch interval and outputs the results of the processing to the spooler. The auditor then audits the replayed and processed events as described in the previous Figures and continues until all replayed events are successfully processed, or the replay level exceeds the max replay amount.

FIG. 6E is a flow diagram illustrating a method for operating a scoreboard according to some embodiments of the disclosure.

In step 602e, the method (600e) updates a scoreboard with a replay level of one (signaling a first replay attempt for a given batch interval). In the illustrated embodiment, step 602e is initiated after the real COB is signaled. As described above, the scoreboard (514) may comprise a distributed database communicatively coupled to the stream processor and, in some embodiments, to the spooler.

In step 604e, the method (600e) freezes the stream processor replay level. In one embodiment, a deduplication bolt in the stream processing topology periodically polls the scoreboard (514), looking for updates to the replay level. As used herein, a deduplication bolt refers to a bolt in the stream processing topology that inspects elements and filters out duplicate bolts. When the deduplication bolt identifies this change, it updates its internal state to reflect that a given batch interval is now frozen at a respective replay level (e.g., level one). Upon freezing, the deduplication bolt will drop any events in the batch interval that have a replay level lower than the respective replay level. Thus, if the frozen replay level is one, any events having a replay level of zero (e.g., new events) will be dropped and not emitted to the streaming queues (408a, 408b).

In step 606e, the method (600e) writes a flush signal to partitions of the streaming queue (408b). In one embodiment, the deduplication bolt will transmit a flush signal to each partition that the bolt manages in the streaming queue (408b). In some embodiments, a given bolt may manage multiple partitions in the queue. Thus, the bolt may flush each partition it manages.

In step 608e, the method (600e) closes any open file handlers for the queue partitions. In one embodiment, the spooler (308) reads the flush signal from the streaming queue (408a). In response, the spooler (308) identifies the partitions associated with the flush signals and identifies any open files that are associated with the partitions. Next, the spooler (308) closes each of the identified files. In some embodiments, the spooler (308) may wait until all pending writes are completed before closing each file, thus ensuring that all data in flushed partitions of the streaming queue (408a) have been written out to the relevant files.

In step 610e, the method (600e) updates the scoreboard upon successfully flushing each partition. In one embodiment, the spooler (308) transmits a message to the scoreboard that indicates that the flush was complete and successful. Thus, in some embodiments, the spooler (308) communicates directly with the scoreboard (514). In some embodiments, the spooler (308) specifically updates the entry for the current frozen replay level.

In step 612e, the method (600e) polls the scoreboard until the flush was successful. In some embodiments, the auditor continuously polls the scoreboard after updating the scoreboard in step 602e. In some embodiments, the scoreboard (514) stores the flush status for each partition. Thus, in step 612e, the method (600e) determines if each partition has successfully been flushed.

In step 614e, the method (600e) initiates the audit after all partitions were successfully flushed. In some embodiment, the method (600e) transitions to step 606A of FIG. 6A.

Figure 7:
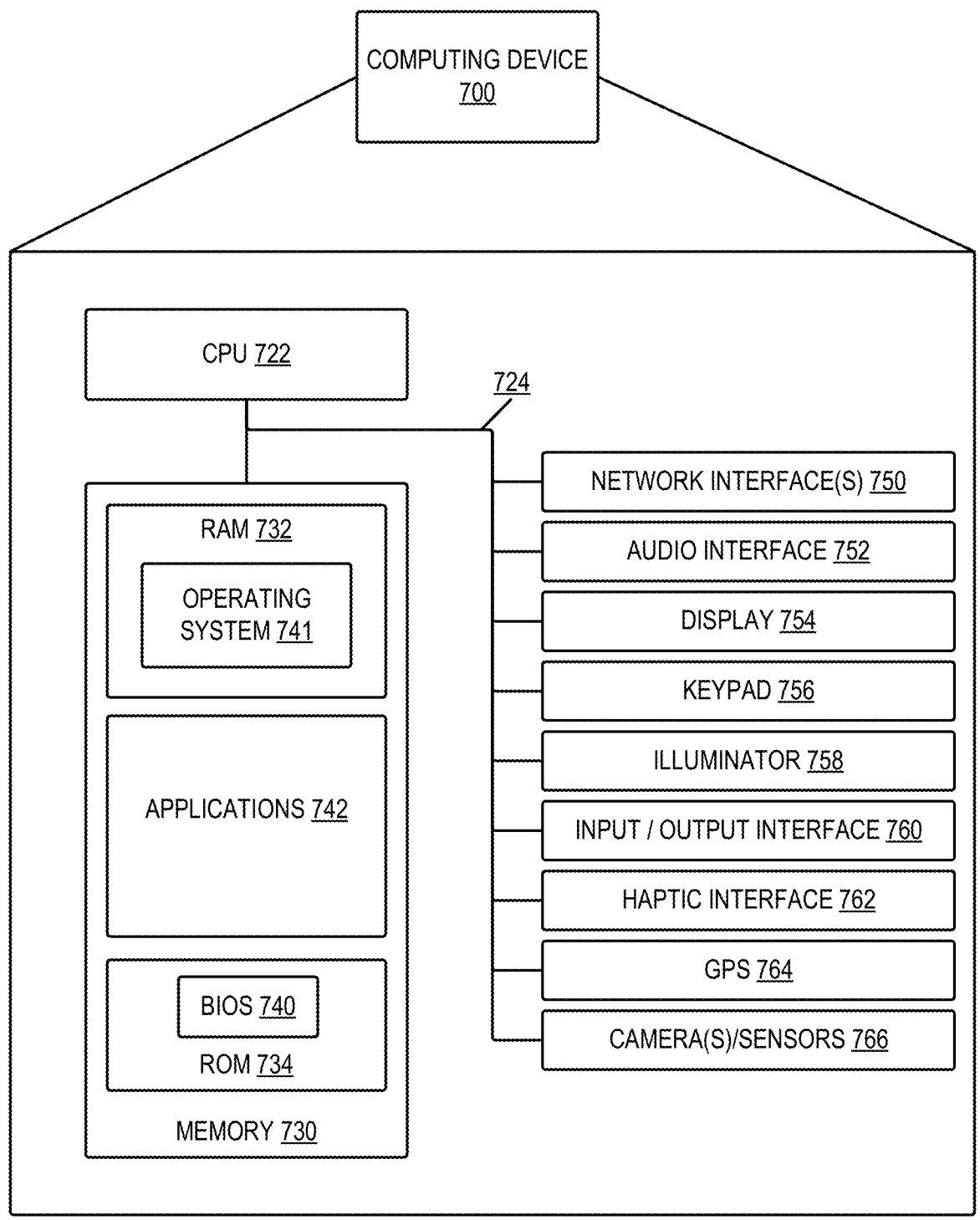
FIG. 7 is a schematic diagram illustrating a computing device showing an example embodiment of a client or server device used in the various embodiments of the disclosure.

FIG. 7 is a schematic diagram illustrating a computing device showing an example embodiment of a client or server device used in the various embodiments of the disclosure.

The computing device (700) may include more or fewer components than those shown in FIG. 7. For example, a server computing device may not include audio interfaces, displays, keypads, illuminators, haptic interfaces, GPS receivers, cameras, or sensors.

As shown in the figure, the device (700) includes a processing unit (CPU) (722) in communication with a mass memory (730) via a bus (724). The computing device (700) also includes one or more network interfaces (750), an audio interface (752), a display (754), a keypad (756), an illuminator (758), an input/output interface (760), a haptic interface (762), an optional global positioning systems (GPS) receiver (764) and a camera(s) or other optical, thermal, or electromagnetic sensors (766). Device (700) can include one camera/sensor (766), or a plurality of cameras/sensors (766), as understood by those of skill in the art. The positioning of the camera(s)/sensor(s) (766) on the device (700) can change per device (700) model, per device (700) capabilities, and the like, or some combination thereof.

The computing device (700) may optionally communicate with a base station (not shown), or directly with another computing device. Network interface (750) is sometimes known as a transceiver, transceiving device, or network interface card (NIC).

The audio interface (752) produces and receives audio signals such as the sound of a human voice. For example, the audio interface (752) may be coupled to a speaker and microphone (not shown) to enable telecommunication with others or generate an audio acknowledgment for some action. Display (754) may be a liquid crystal display (LCD), gas plasma, light-emitting diode (LED), or any other type of display used with a computing device. Display (754) may also include a touch-sensitive screen arranged to receive input from an object such as a stylus or a digit from a human hand.

Keypad (756) may comprise any input device arranged to receive input from a user. Illuminator (758) may provide a status indication or provide light.

The computing device (700) also comprises input/output interface (760) for communicating with external devices, using communication technologies, such as USB, infrared, Bluetooth™, or the like. The haptic interface (762) provides tactile feedback to a user of the client device.

Optional GPS transceiver (764) can determine the physical coordinates of the computing device (700) on the surface of the Earth, which typically outputs a location as latitude and longitude values. GPS transceiver (764) can also employ other geo-positioning mechanisms, including, but not limited to, triangulation, assisted GPS (AGPS), E-OTD, CI, SAI, ETA, BSS, or the like, to further determine the physical location of the computing device (700) on the surface of the Earth. In one embodiment, however, the computing device (700) may through other components, provide other information that may be employed to determine a physical location of the device, including, for example, a MAC address, Internet Protocol (IP) address, or the like.

Mass memory (730) includes a RAM (732), a ROM (734), and other storage means. Mass memory (730) illustrates another example of computer storage media for storage of information such as computer-readable instructions, data structures, program modules, or other data. Mass memory (730) stores a basic input/output system ("BIOS") (740) for controlling the low-level operation of the computing device (700). The mass memory also stores an operating system (741) for controlling the operation of the computing device (700)

Applications (742) may include computer-executable instructions which, when executed by the computing device (700), perform any of the methods (or portions of the methods) described previously in the description of the preceding Figures. In some embodiments, the software or programs implementing the method embodiments can be read from hard disk drive (not illustrated) and temporarily stored in RAM (732) by CPU (722). CPU (722) may then read the software or data from RAM (732), process them, and store them to RAM (732) again.

For this disclosure, a module is a software, hardware, or firmware (or combination thereof) system, process or functionality, or component thereof. A module performs or facilitates the processes, features, or functions described herein (with or without human interaction or augmentation). A module can include sub-modules. Software components of a module may be stored on a computer-readable medium for execution by a processor. Modules may be integral to one or more servers or be loaded and executed by one or more servers.

The terms "user," "subscriber," "consumer" or "customer" refer to a user of an application or applications as described herein or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

One of skill in the art may implement the methods and systems of the present disclosure in many manners. As such, the disclosed embodiments are not to be limited by the preceding exemplary embodiments and examples. In other words, functional elements being performed by single or multiple components, in various combinations of hardware and software or firmware, and individual functions, may be distributed among software applications at either the client level or server level or both. In this regard, one may combine any number of the features of the different embodiments described herein into single or multiple embodiments, and alternate embodiments having fewer than or more than, all the features described herein are possible.

Functionality may also be, in whole or in part, distributed among multiple components, in manners now known or to become known. Thus, myriad software/hardware/firmware combinations are possible in achieving the functions, features, interfaces, and preferences described herein. Moreover, the scope of the present disclosure covers conventionally known manners for carrying out the described features and functions and interfaces. The scope of the present disclosure may also cover variations and modifications made to the hardware or software or firmware components described herein as would be understood by those skilled in the art.

Furthermore, the embodiments of methods presented and described as flowcharts in this disclosure are provided by way of example to provide a complete understanding of the technology. The disclosed methods are not limited to the operations and logical flow presented herein. Alternative embodiments exist that alter the order of the various operations or include independent sub-operations that are part of a more extensive operation.

While the disclosure describes various embodiments, such embodiments should not limit the teaching of this disclosure to those embodiments. Various changes and modifications may be made to the elements and operations described above to obtain a result that remains within the scope of the systems and processes described in this disclosure.

What is claimed is:

1. A method comprising:
   detecting a real close of books (COB) of a data transport, the real COB associated with a set of raw events transmitted over the data transport and detected after a preconfigured number of validations have occurred for a corresponding batch time, the preconfigured number of validations corresponding to a ratio between the set of raw events transmitted over the data transport and a second set of events written to a raw event storage device;
   flushing a stream processor in response to detecting the real COB;
   retrieving a set of processed events from a distributed file system after the flushing is complete;
   performing a fact COB computation on the set of processed events and the set of raw events, the set of processed events and the set of raw events cogrouped using shared join keys, the fact COB computation outputting a number of missing events, each missing event representing a raw event that is not cogrouped with a corresponding processed event; and
   certifying the processed events upon determining that the number of missing events is below a threshold.

2. The method of claim 1, further comprising initiating a replay of the missing events if the number of missing events is above a threshold.

3. The method of claim 1, the detecting the real close of books comprising determining that a ratio of the number of events received over the data transport and the number of events written to a raw event storage is above a preconfigured threshold.

4. The method of claim 1, further comprising identifying a set of missing events based on the cogrouping, the missing events comprising empty cells in a relation generated by the cogrouping.

5. The method of claim 1, the flushing the stream processor comprising updating a scoreboard indicating with a replay level associated with a batch interval associated with the real COB.

6. The method of claim 5, the flushing the stream processor further comprising polling the scoreboard to determine that the flushing is complete.

7. A non-transitory computer-readable storage medium for tangibly storing computer program instructions capable of being executed by a computer processor, the computer program instructions defining steps of:
   detecting a real close of books (COB) of a data transport, the real COB associated with a set of raw events transmitted over the data transport and detected after a preconfigured number of validations have occurred for a corresponding batch time, the preconfigured number of validations corresponding to a ratio between the set of raw events transmitted over the data transport and a second set of events written to a raw event storage device;
   flushing a stream processor in response to detecting the real COB;
   retrieving a set of processed events from a distributed file system after the flushing is complete;
   performing a fact COB computation on the set of processed events and the set of raw events, the set of processed events and the set of raw events comprising cogrouping the processed events and the raw events based on a join key, the fact COB computation outputting a number of missing events, each missing event representing a raw event that is not cogrouped with a corresponding processed events; and
   certifying the processed events upon determining that the number of missing events is below a threshold.

8. The computer-readable storage medium of claim 7, further comprising initiating a replay of the missing events if the number of missing events is above a threshold.

9. The computer-readable storage medium of claim 7, the detecting the real close of books comprising determining that a ratio of the number of events received over the data transport and the number of events written to a raw event storage is above a preconfigured threshold.

10. The computer-readable storage medium of claim 7, further comprising identifying a set of missing events based on the cogrouping, the missing events comprising empty cells in a relation generated by the cogrouping.

11. The computer-readable storage medium of claim 7, the flushing the stream processor comprising updating a scoreboard indicating with a replay level associated with a batch interval associated with the real COB.

12. The computer-readable storage medium of claim 11, the flushing the stream processor further comprising polling the scoreboard to determine that the flushing is complete.

13. A device comprising:
   a processor; and
   a storage medium for tangibly storing thereon program logic for execution by the processor, the stored program logic causing the processor to perform operations of:
      detecting a real close of books (COB) of a data transport, the real COB associated with a set of raw events transmitted over the data transport and detected after a preconfigured number of validations have occurred for a corresponding batch time, the preconfigured number of validations corresponding to a ratio between the set of raw events transmitted over the data transport and a second set of events written to a raw event storage device;
      flushing a stream processor in response to detecting the real COB;
      retrieving a set of processed events from a distributed file system after the flushing is complete;
      performing a fact COB computation on the set of processed events and the set of raw events, the set of processed events and the set of raw events comprising cogrouping the processed events and the raw events based on a join key, the fact COB computation outputting a number of missing events, each missing event representing a raw event that is not cogrouped with a corresponding processed events; and certifying the processed events upon determining that the number of missing events is below a threshold.

14. The device of claim 13, the detecting the real close of books comprising determining that a ratio of the number of events received over the data transport and the number of events written to a raw event storage is above a preconfigured threshold.

15. The device of claim 13, the operations further comprising identifying a set of missing events based on the cogrouping, the missing events comprising empty cells in a relation generated by the cogrouping.

16. The device of claim 13, the flushing the stream processor comprising updating a scoreboard indicating with a replay level associated with a batch interval associated with the real COB.

17. The device of claim 16, the flushing the stream processor further comprising polling the scoreboard to determine that the flushing is complete.

* * * * *